United States Patent
Sekiguchi et al.

(10) Patent No.: US 8,191,009 B2
(45) Date of Patent: *May 29, 2012

(54) DISPLAY CONTROL DEVICE AND METHOD

(75) Inventors: Takuya Sekiguchi, Katano (JP); Taketo Yoshii, Amagasaki (JP); Kouichi Yasutake, Nagaokakyo (JP); Kazuo Okamura, Hirakata (JP)

(73) Assignee: Panasonic Corporation, Osaka (JP)

( * ) Notice: Subject to any disclaimer, the term of this patent is extended or adjusted under 35 U.S.C. 154(b) by 687 days.

This patent is subject to a terminal disclaimer.

(21) Appl. No.: 10/740,563

(22) Filed: Dec. 22, 2003

(65) Prior Publication Data

US 2004/0130563 A1 Jul. 8, 2004

Related U.S. Application Data

(62) Division of application No. 09/320,543, filed on May 27, 1999, now Pat. No. 6,710,789.

(30) Foreign Application Priority Data

May 28, 1998 (JP) .................................... 10-147815

(51) Int. Cl.
*G06F 3/00* (2006.01)
*G06F 3/048* (2006.01)

(52) U.S. Cl. ...................................... 715/807; 715/806

(58) Field of Classification Search .................. 715/806, 715/797, 794, 790, 765, 807
See application file for complete search history.

(56) References Cited

U.S. PATENT DOCUMENTS

| | | | | |
|---|---|---|---|---|
| 4,783,648 A | * | 11/1988 | Homma et al. | 715/794 |
| 4,890,257 A | * | 12/1989 | Anthias et al. | 715/807 |
| 4,897,801 A | | 1/1990 | Kazama et al. | |
| 4,954,818 A | * | 9/1990 | Nakane et al. | 715/790 |
| 5,091,717 A | | 2/1992 | Carrie et al. | |
| 5,335,323 A | * | 8/1994 | Kolnick | 715/765 |
| 5,487,143 A | * | 1/1996 | Southgate | 715/790 |

(Continued)

FOREIGN PATENT DOCUMENTS

EP 0747805 11/1996

(Continued)

OTHER PUBLICATIONS

European Search Report for European Patent Application No. EP 03075465.9, mailed on May 14, 2003.

(Continued)

*Primary Examiner* — Boris Pesin
*Assistant Examiner* — Brandon Parker
(74) *Attorney, Agent, or Firm* — Greenblum & Bernstein, P.L.C.

(57) ABSTRACT

The present invention provides a device and a method for displaying appropriately on the display area for each processing unit such as an application according to the applied equipment. The CPU 12 processes display area acquisition requests from a plurality of processing units R1-Rn according to a display management program. The display management program decides whether use of the display area is allowed to each processing unit, considering the relationship of the plurality of display areas requested from each processing unit R1-Rn. Each processing unit R1-Rn executes display processing for the display area for which use is allowed. In this way, whether use is allowed is notified from the display management program to each processing unit R1-Rn after each processing unit R1-Rn sends the display area acquisition request. As a consequence, display in a plurality of areas by each processing unit R1-Rn can be controlled appropriately.

18 Claims, 49 Drawing Sheets

U.S. PATENT DOCUMENTS

| | | | |
|---|---|---|---|
| 5,548,304 A * | 8/1996 | Yoshino et al. | 715/856 |
| 5,668,997 A | 9/1997 | Lynch-Freshner et al. | |
| 5,675,755 A * | 10/1997 | Trueblood | 715/791 |
| 5,720,016 A | 2/1998 | Egashira | 358/1.18 |
| 5,734,380 A * | 3/1998 | Adams et al. | 715/804 |
| 5,825,359 A * | 10/1998 | Derby et al. | 715/807 |
| 5,877,762 A * | 3/1999 | Young | 715/803 |
| 6,005,562 A * | 12/1999 | Shiga et al. | 715/721 |
| 6,470,376 B1 * | 10/2002 | Tanaka et al. | 718/108 |
| 2004/0080540 A1 | 4/2004 | Sekiguchi et al. | |
| 2004/0107438 A1 | 6/2004 | Sekiguchi et al. | |
| 2004/0119706 A1 | 6/2004 | Sekiguchi et al. | |
| 2004/0130540 A1 | 7/2004 | Sekiguchi et al. | |
| 2004/0130577 A1 | 7/2004 | Sekiguchi et al. | |
| 2004/0155906 A1 | 8/2004 | Sekiguchi et al. | |
| 2006/0190838 A1 * | 8/2006 | Nadamoto | 715/781 |

FOREIGN PATENT DOCUMENTS

| | | |
|---|---|---|
| JP | 1-100662 | 4/1989 |
| JP | 4-274289 | 9/1992 |
| JP | 2000-47784 | 2/2000 |
| JP | 2004-005698 A | 1/2004 |
| JP | 2006-318479 A | 11/2006 |
| WO | 98/13752 | 4/1998 |
| WO | WO 98/13752 | 4/1998 |

OTHER PUBLICATIONS

Article entitled "Method for Keeping Windows From Overlapping Important Information," IBM Technical Disclosure Bulletin, IBM Corp., New York, vol. 29, No. 10; pp. 4553-4554 (XP000021718; ISSN: 0018-8689).

Article by Cohen, E.S., et al. entitled "Automatic Strategies in the Siemens RTL Tiled Window Manager," $2^{nd}$ IEEE Conference on Computer Workstations, US, Washington, IEEE Computer Society Press; pp. 111-119 (XP00001098).

English Language Abstract of JP 4-274289.

English Language Abstract of JP 1-100662.

English language Abstract of JP 2006-318479 A.

English language Abstract of JP 2004-005698 A.

Office Action from E.P.O. (Appl. No. 05075935.6), mail date is Jul. 13, 2010.

Office Action from E.P.O. (Appl. No. 05075936.4), mail date is Jul. 13, 2010.

Office Action from E.P.O. (Appl. No. 05075970.3), mail date is Jul. 14, 2010.

Office Action from E.P.O. (Appl. No. 05075943.0), mail date is Jul. 13, 2010.

* cited by examiner

FIG.6

DISPLAY AREA DEFINITION TABLE

| AREA | ORIGIN COORDINATE | WIDTH | HEIGHT | REMARKS |
|------|-------------------|-------|--------|---------|
| E1 | (0, 0) | 340 | 210 | UPPER LEFT HALF SCREEN AREA |
| E2 | (340, 0) | 340 | 210 | UPPER RIGHT HALF SCREEN AREA |
| E3 | (0, 210) | 680 | 210 | LOWER HALF SCREEN AREA |

FIG.7

ACQUISITION STATUS STORAGE TABLE

A

| AREA | TASK |
|---|---|
| E1 | |
| E2 | |
| E3 | |

B

| AREA | TASK |
|---|---|
| E1 | |
| E2 | T1 |
| E3 | |

FIRST EMBODIMENT
(FLOW CHART OF ACQUISITION REQUEST PROCESSING)

FIG.10

FIRST EMBODIMENT
(FLOW CHART OF RELEASE REQUEST PROCESSING)

FIG.15

DISPLAY AREA DEFINITION TABLE

| AREA | ORIGIN COORDINATE | WIDTH | HEIGHT | REMARKS |
|---|---|---|---|---|
| E1 | (0, 0) | 680 | 420 | ENTIRE SCREEN AREA |
| E2 | (0, 0) | 340 | 420 | LEFT HALF SCREEN AREA |
| E3 | (340, 0) | 340 | 420 | RIGHT HALF SCREEN AREA |
| E4 | (0, 0) | 680 | 210 | UPPER HALF SCREEN AREA |
| E5 | (0, 210) | 680 | 210 | LOWER HALF SCREEN AREA |

FIG.16
ACQUISITION STATUS STORAGE TABLE　　　DISPLAY SCREEN
A
| AREA | PROCESSING UNIT | KEY, NUMBER |
|---|---|---|
| E1 | | |
| E2 | | |
| E3 | | |
| E4 | | |
| E5 | | |
B
| AREA | PROCESSING UNIT | KEY NUMBER |
|---|---|---|
| E1 | | |
| E2 | R1 | 2105151305 |
| E3 | | |
| E4 | | |
| E5 | | |
DISPLAY BY PROCESSING UNIT R1
C
| AREA | PROCESSING UNIT | KEY NUMBER |
|---|---|---|
| E1 | | |
| E2 | R1 | 2105151305 |
| E3 | R2 | 3205151307 |
| E4 | | |
| E5 | | |
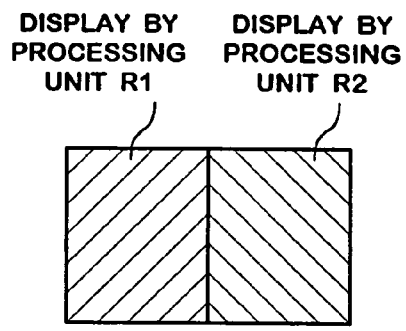
DISPLAY BY PROCESSING UNIT R1　　DISPLAY BY PROCESSING UNIT R2
D
| AREA | PROCESSING UNIT | KEY NUMBER |
|---|---|---|
| E1 | | |
| E2 | R4 | 2105151309 |
| E3 | R2 | 3205151307 |
| E4 | | |
| E5 | | |
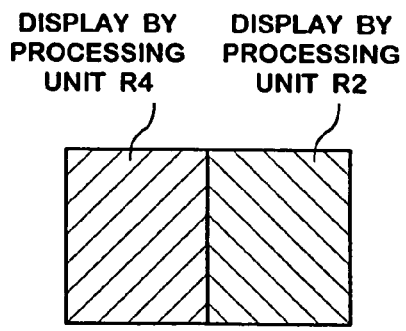
DISPLAY BY PROCESSING UNIT R4　　DISPLAY BY PROCESSING UNIT R2

FIG.17

COEXISTENCE RELATIONSHIP TABLE

| AREA | AREAS WHICH CANNOT COEXIST |
|---|---|
| E1 | E2, E3, E4, E5 |
| E2 | E1, E4, E5 |
| E3 | E1, E4, E5 |
| E4 | E1, E2, E3 |
| E5 | E1, E2, E3 |

FIG.19

PROGRAM SCHEDULE

BOOOK TV  4/26 (MON)
NEWS #74  15:00~16:00  [BOOK] 627

| 4/26 (MON) | [BOOK] 627 | [C] 628 | | |
|---|---|---|---|---|
| 15 | 00 BOOK TV NEWS #74 | 00 MOM & KIDS TIME | | |
| 16 | 00 TRY KIDS... | 00 FRIEND TIME | | |
| | 30 MAGAZINE... | | | |
| 17 | 00 FEEL LIKE READING | 00 MANIAC TIME | | |

SECOND EMBODIMENT
(FLOW CHART OF SUPERVISORY PROCESSING)

SECOND EMBODIMENT
(FLOW CHART OF SUPERVISORY PROCESSING)

FIG.23

DISPLAY PRIORITY TABLE

| AREA | PRIORITY |
|---|---|
| E1 | 1 |
| E2 | 2 |
| E3 | 2 |
| E4 | 3 |
| E5 | 3 |

**THIRD EMBODIMENT
(FLOW CHART OF ACQUISITION REQUEST PROCESSING)**

DEFINITIONS OF DISPLAY AREAS ON SCREEN

COEXISTENCE RELATIONSHIP TABLE

| AREA | AREA WHICH CANNOT COEXIST |
|---|---|
| E1 | E2, E3 |
| E2 | E1 |
| E3 | E1 |
| E4 | |

FIG.27

DISPLAY AREA PRIORITY TABLE

| AREA | PRIORITY |
|------|----------|
| E1 | 2 |
| E2 | 3 |
| E3 | 3 |
| E4 | 1 |

FLOW CHART OF DISPLAY PROCESSING

FIG.30

PROCESSING UNIT PRIORITY TABLE

| AREA | PRIORITY |
|------|----------|
| T1 | 2 |
| T2 | 1 |
| T3 | 4 |
| T4 | 3 |

FOURTH EMBODIMENT
(FLOW CHART OF ACQUISITION REQUEST PROCESSING)

FIG.33

DEPENDENCY RELATIONSHIP TABLE

| AREA | AREA TO DEPEND ON | AREA TO BE CHANGED |
|------|-------------------|--------------------|
| ⋮ | ⋮ | ⋮ |
| E2 | E1 | E3 |
| E2 | E4 | E3 |
| E2 | E5 | E3 |
| ⋮ | ⋮ | ⋮ |
| E5 | E1 | E4 |

FIFTH EMBODIMENT
(FLOW CHART OF ACQUISITION REQUEST PROCESSING)

FIG.35

ACQUISITION STATUS STORAGE TABLE

DISPLAY SCREEN

A

| AREA | PROCESSING UNIT | KEY NUMBER |
|---|---|---|
| E1 | T1 | 1 1 0 5 1 5 1 3 1 2 |
| E2 | | |
| E3 | | |
| E4 | | |
| E5 | | |

DISPLAY BY PROCESSING UNIT R1

B

| AREA | PROCESSING UNIT | KEY NUMBER |
|---|---|---|
| E1 | | |
| E2 | T2 | 2 2 0 5 1 5 1 3 2 1 |
| E3 | T1 | 3 1 0 5 1 5 1 3 2 2 |
| E4 | | |
| E5 | | |

DISPLAY BY PROCESSING UNIT R2    DISPLAY BY PROCESSING UNIT R1

FIG.37

AVAILABLE RESOURCE TABLE

| PROCESSING UNIT | AVAILABLE RESOURCE |
|---|---|
| R1 | MODEM |
| R2 | MODEM,SPEAKER |
| R3 | NONE |

FIG.38

USE RESOURCE TABLE

| RESOURCE | PROCESSING UNIT USING RESOURCE |
|---|---|
| MODEM | R1 |
| SPEAKER | |
| VIDEO | |

SIXTH EMBODIMENT
(FLOW CHART OF ACQUISITION REQUEST PROCESSING)

SEVENTH EMBODIMENT
(FLOW CHART OF RELEASE REQUEST PROCESSING)

FIG.43

ACQUISITION WAIT TABLE

A

| PROCESSING UNIT | REQUESTED AREA |
|---|---|
|  |  |
|  |  |
| ⋮ | ⋮ |

B

| PROCESSING UNIT | REQUESTED AREA |
|---|---|
| R 4 | E 2 |
|  |  |
| ⋮ | ⋮ |

SEVENTH EMBODIMENT
(FLOW CHART OF PROCESSING OF ACQUISITION REQUESTS IN WAITING STATUS)

FIG.47

DISPLAY AREA DEFINITION TABLE

| AREA | ORIGIN COORDINATE | WIDTH | HEIGHT | REMARKS |
|---|---|---|---|---|
| E1 | (0, 0) | 340 | 210 | UPPER LEFT HALF SCREEN AREA |
| E2 | (340, 0) | 340 | 210 | UPPER RIGHT HALF SCREEN AREA |
| E3 | (0, 210) | 680 | 210 | LOWER HALF SCREEN AREA |

FIG.48

ACQUISITION RIGHT INFORMATION TABLE

| AREA | TASK |
|---|---|
| E1 | T1 |
| E2 | T2 |
| E3 | T3 |

EIGHTH EMBODIMENT
(FLOW CHART OF ACQUISITION REQUEST PROCESSING)

FIG.50

ACQUISITION RIGHT INFORMATION TABLE

| AREA | TASK |
|---|---|
| E1 | T1, T2, T5 |
| E2 | T2 |
| E3 | T4, T3 |

FIG.51

ACQUISITION RIGHT INFORMATION TABLE

| AREA | TASK | USABLE TASKS |
|---|---|---|
| E1 | T1, T2, T5 | 2 |
| E2 | T2 | 1 |
| E3 | T3, T4 | 2 |

FIG.53

ACQUISITION STATUS STORAGE TABLE

| AREA | TASK |
|------|------|
| E1 | T1, T2 |
| E2 | |
| E3 | T3 |

DISPLAY CONTROL DEVICE AND METHOD

This application is a division of U.S. patent application Ser. No. 09/320,543, filed May 27, 1999 now U.S. Pat. No. 6,710,789.

CROSS REFERENCE TO RELATED APPLICATIONS

All the disclosure in Japanese Patent Applications HEI 10-147815 "Display control device and method" (filed on May 28, 1998) and HEI 11-133419 "Display control device and method" (filed on May 14, 1999), including specifications, claims, drawings and abstract, are hereby incorporated herein reference.

BACKGROUND OF THE INVENTION

1. Field of the Invention

The present invention relates to a technology for control display on a screen by a plurality of processing units (tasks and applications), and more particularly to an allocation of the display area.

2. Description of the Related Art

When a plurality of applications display on one screen, a window system, such as X-Window System, has been used. In these window systems, each application displays acquiring the respective window (multi-window).

Japanese Laid-Open Patent Application HEI4-274289 discloses a device which groups windows acquired by each application, and displays or does not display in group units.

Also in accordance with Japanese Patent Laid-Open No. 1-100662, when contents displayed on a plurality of windows are inter-related, these plurality of windows are simultaneously displayed so that the user can easily understand the display contents.

However, with the conventional display based on a multi-window, what application displays on what display area basically depends on the application. Therefore it is possible for an application to display a window which overlaps with the window displayed by another application. When such a problem occurs, the user must change the position of the window which is overlapped by another window in order to view the display of the window, which is troublesome.

In satellite broadcasting TV, where users need not change the positions of windows, different applications must be used to prevent the overlapping display of windows. For such devices, a conventional window system cannot be used.

In accordance with the Japanese Laid-Open Patent Application HEI4-274289, multiple windows specified by an application are grouped so as to improve the operability of each window, but the handling of overlapping of windows depends on the application. In other words, an undesired display of multi-windows is inevitable, and the above mentioned problems are not solved.

In accordance with the Japanese Laid-Open Patent Application HEI1-100662, the handling of overlapping windows also depends on the application, where an undesired display of multi-windows is still inevitable, and the above mentioned problems are not solved.

SUMMARY OF THE INVENTION

With the foregoing in view, it is an object of the present invention to provide a device and a method which can display data in an appropriate display area for each processing unit, such as an application, according to the applied equipment.

(1) A display control device and method according to the present invention defines a plurality of display areas in the display device, and when a display area acquisition request is received from each processing unit, it is decided whether to use the requested display area, and the processing unit which is allowed to use the display area can display data there. By defining display areas in advance, and by allowing the use of each display area, without leaving control to each processing unit, an appropriate display for each processing unit according to the applied equipment becomes possible. Also inappropriate display is prevented.

(2) When display area acquisition requests are received from a plurality of processing units, the display control device according to the present invention judges whether the display areas subject to respective acquisition requests can coexist, and if the plurality of processing units are requesting acquisition of display areas which cannot coexist, use is allowed to one of the processing units. As a consequence, a plurality of display processing which cannot coexist can be prevented and appropriate display becomes possible.

(3) When the display areas subject to respective acquisition requests all or partially overlap, the display control device according to the present invention judges as coexistence impossible. As a consequence, it is possible to control such that displays by a plurality of processing units do not overlap.

(4) When a plurality of processing units request acquisition of one display area, the display control device according to the present invention judges as coexistence impossible. As a consequence, it is possible to control such that two or more processing units are not allowed to use one display area.

(5) When a plurality of display areas subject to respective acquisition requests partially overlap, the display control device according to the present invention judges as coexistence possible. As a consequence, it is possible to control such that a partial overlapping display is allowed.

(6) When a display processing is executed for a plurality of display areas which can coexist with partial overlapping portions, the display control device in accordance with the present invention displays assigning priority to an area having a higher priority in the overlapped portion. As a consequence, it is possible to control such that the overlapped portion is displayed according to priority.

(7) The display control device in accordance with the present invention judges the possibility of coexistence based on the coexistence relationship information where the possibility of coexistence of a plurality of display areas has been defined in advance. As a consequence, it is possible to quickly judge whether the requested display areas can coexist.

(8) When an acquisition request for a display area which cannot coexist is received, the display control device in accordance with the present invention allows use to the processing unit which sent the request first. As a consequence, it is possible to assign priority to the display by the processing unit which sent the display request first.

(9) When an acquisition request for a display area which cannot coexist is received, the display control device in accordance with the present invention allows use to the processing unit which has the higher priority. As a consequence, it is possible to display data which is most urgent, such as a warning display.

(10) When an acquisition request for a display area which cannot coexist is received, the display control device in accordance with the present invention allows use to the processing unit which requests the area having the highest priority. As a consequence, areas in a display can be different depending on the urgency.

(11)-(14) The display control device according to the present invention stores a processing unit which requested acquisition but was not allowed use of the display area as an acquisition waiting, and allows use of the display area when allowance is possible. As a consequence, use is allowed sequentially for display area acquisition requests. Each processing unit does not have to request acquisition again. If use is allowed considering the order of received requests, priority given to the processing units, and priority given to the display areas, then use can be allowed according to sequence in the order considering such priorities.

(15) When a request for a display area which cannot coexist is received, the display control device according to the present invention changes the display area requested by one or more processing units so as to allow use as a plurality of display areas which can coexist. As a consequence, a plurality of displays can coexist as much as possible while maintaining an appropriate display by a plurality of display areas.

(16) When a request for a display area which cannot coexist is received, the display control device according to the present invention changes the display area based on dependency relationship information defining the changes of the display area to make coexistence possible. As a consequence, the display area can be quickly changed so as to make coexistence possible.

(17) (21) The display control device according to the present invention defines the processing units which are allowed use for each display area as acquisition right information, and when a display area acquisition request is received from each processing unit, the display control device refers to the acquisition right information and decides whether use of the display area is allowed for each processing unit. As a consequence, it is possible to control by allocating processing units for each display area.

(18) The display control device according to the present invention does not allow two or more processing units simultaneous use of one display area. As a consequence, it is possible to control so as to correlate a display area and a processing unit on a one-to-one basis.

(19) (20) The display control device according to the present invention allows two or more processing units simultaneous use of one display area. As a consequence, it is possible to control so as to allow two or more processing units to use one display area.

(22) (23) When the processing unit which requested the display area is actually not in a state to display on the display area, or is not in a state to execute processing related to the display processing, the display control device according to the present invention does not allow the processing unit to use the display area even if the display area requested by the processing unit can coexist with display areas requested by other processing units. As a consequence, to make display efficient, use is not allowed for a processing unit which cannot actually execute display processing and processing related to display.

(24) The display control device according to the present invention also has display processing supervisory means, wherein when each processing unit executes display processing for each display area, it is supervised whether the display processing is by a processing unit which is allowed use of the display area. As a consequence, execution of invalid display processing can be supervised.

(25) (26) The display control device according to the present invention assigns a key to the processing unit when use of a display area is allowed, and the display processing supervisory means supervises by judging whether the key shown by the processing unit is the correct key. As a consequence, invalid display processing can be easily supervised. By assigning a different key each time, invalid display processing using an old key can be prevented.

(27) When a processing unit attempted to execute display processing for a display area which is not allowed use is discovered, the display control device according to the present invention executes processing to disable the display processing by the processing unit. As a consequence, a processing unit which attempted invalid display processing can be removed.

In the present invention, "processing unit" refers to a set of processings to obtain a certain result. One processing unit may be comprised of one task, but may include two or more tasks.

The concept "case when all the display areas subject to the acquisition requests overlap" includes the case when two or more acquisition requests are received for the same display area.

"Cannot coexist" is the case when displaying in a plurality of display areas is not desirable. Depending on the equipment to which the display control device is applied to or depending on the status, a plurality of display areas may not be able to coexist if a part of the display area overlaps, or may be able to coexist even if overlapping exists in a predetermined allowable range. There is also a case when a specific display area can coexist even if it overlaps with another display area.

The concept "resource used by a processing unit" includes not only hardware but also software, such as data and programs.

The concept "display area storage means" refers to a means for storing the definitions of display areas, and includes means for substantially defining display areas, regardless table format or descriptions in a program. In the embodiments, the display area definition table in FIG. 6 falls under this concept.

The concept "display area management means" refers to a means for deciding whether use of the area is allowed at least when a display area acquisition request is received. In the embodiments, the display control program shown in e.g. FIG. 8 falls under this concept.

The concept "computer" refers to a device which executes processing according to a program, and includes a personal computer, and a CPU and MPU built-in to such equipment as a TV.

"Recording medium where a program is recorded" is such a recording medium as ROM, RAM, a flexible disk, CD-ROM, memory card and hard disk, where a program is recorded. This concept includes not only such a recording medium as a hard disk which is connected to a CPU and with which the recorded program is directly executed, but also such a recording medium as CD-ROM which records a program to be executed after installing it on a hard disk. A program here includes not only a program which can be directly executed, but also a source format program, compressed program and enciphered program.

Features, other objectives, applications and effects of the present invention will be clarified by referring to the embodiments and drawings.

BRIEF DESCRIPTION OF THE DRAWINGS

FIG. 6 is a drawing showing content of a display area definition table;

FIG. 7 is a drawing showing content of an acquisition status storage table;

FIG. 10 is an example of a screen display by a plurality of applications;

FIG. 15 is a drawing showing content of a display area definition table;

FIG. 16 is a drawing showing content of an acquisition status storage table;

FIG. 17 is a drawing showing content of a coexistence relationship table;

FIG. 19 is an example of a display of a program schedule on screen;

FIG. 23 is a drawing showing content of a display area priority table;

FIG. 27 is a drawing showing a display area priority table;

FIG. 30 is a drawing showing content of a processing unit priority table;

FIG. 33 is a drawing showing content of a dependency relationship table;

FIG. 35 is a drawing showing content of an acquisition status storage table;

FIG. 37 is a drawing showing content of an available resource table;

FIG. 38 is a drawing showing content of a use resource table;

FIG. 43 is a drawing showing an example of content stored in an acquisition waiting table;

FIG. 47 is a drawing showing a display area definition table;

FIG. 48 is a drawing showing an acquisition right information table;

FIG. 50 is a drawing showing an acquisition right information table;

FIG. 51 is a drawing showing an acquisition right information table where the upper limit of the number of usable tasks is limited;

FIG. 53 is a drawing showing an acquisition status storage table.

DESCRIPTION OF THE PREFERRED EMBODIMENTS

Figure 1:
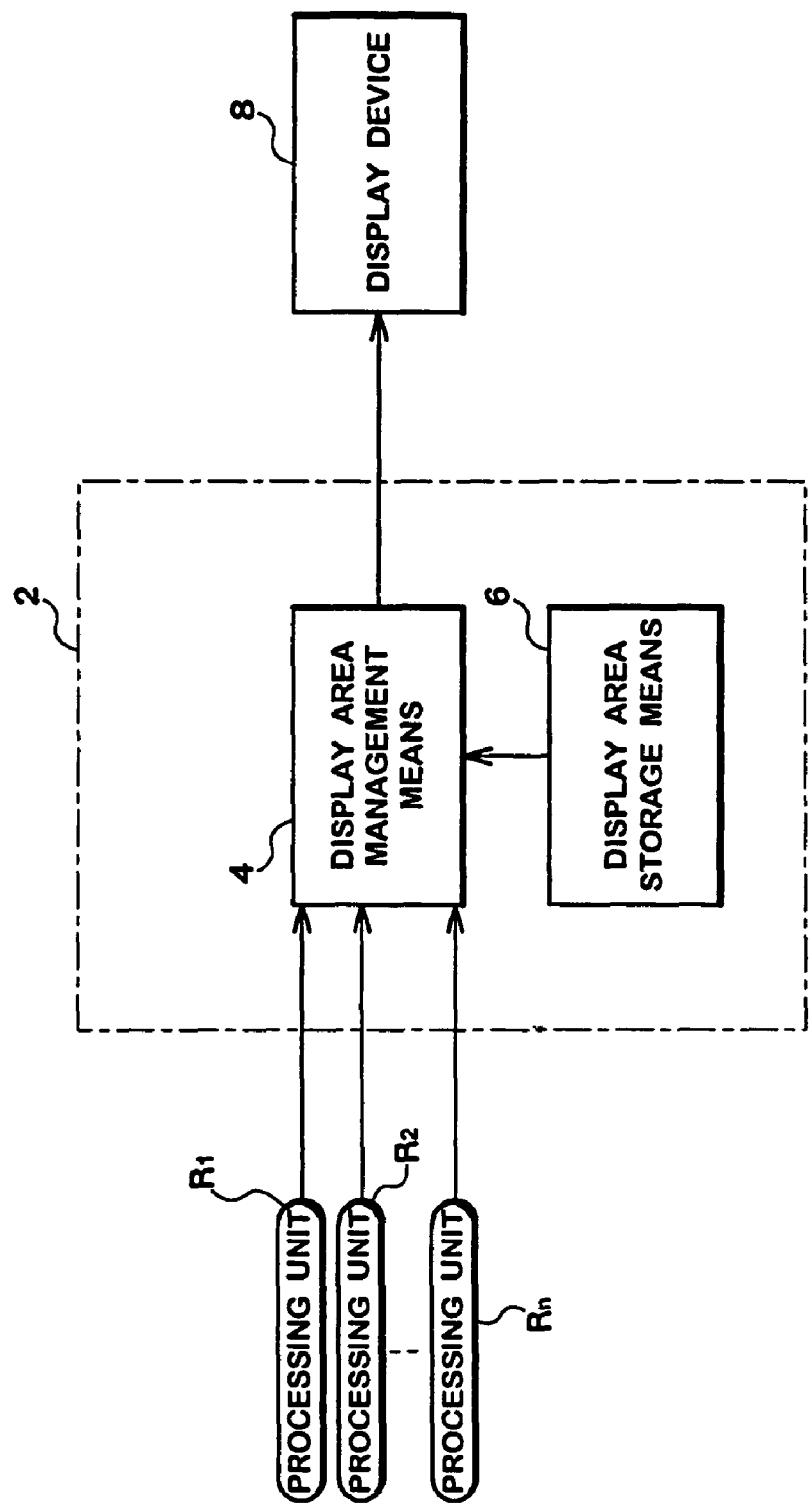
FIG. 1 is a drawing depicting an embodiment of a display control device in accordance with the basic concept of the present invention.

Table of Contents
1. Display control device in accordance with the basic concept of the invention
2. First embodiment
   2.1 General configuration
   2.2 Example of application to digital broadcasting receiver
3. Second embodiment
   3.1 General configuration
   3.2 Embodiment applied to a digital broadcasting receiver
   3.3 Handling of task attempted invalid processing
4. Third embodiment
   4.1 Example when overlapped areas are not allowed to coexist
   4.2 Example when overlapped areas are allowed to coexist
5. Fourth embodiment 6. Fifth embodiment
7. Sixth embodiment
8. Seventh embodiment
9. Other embodiments
10. Eighth embodiments
    10.1 General configuration
    10.2 Example when one processing unit is allocated to one display area
    10.3 Example when a plurality of processing units are allocated to one display area
    10.4 Example when a plurality of tasks are allowed to use one display area 1. Display Control Device in Accordance with the Basic Concept of the Invention FIG. 1 shows a general configuration of the display control device 2 as an embodiment of the basic concept of the present invention. The display control device 2 comprises display area management means 4 and display area storage means 6. The display area storage means 6 stores definitions of a plurality of display areas which are set on a screen of the display device 8. To the display area management means 4, a display area acquisition request for displaying is sent from a plurality of processing units R1-Rn. The display area management means 4 decides whether use of the display area is allowed for each processing unit, considering the relationship of the plurality of display areas requested from each processing unit R1-Rn. Each processing unit R1-Rn executes display processing for the display areas for which use is allowed.

In this way, after each processing unit R1-Rn sends a display area acquisition request, the display area management means 4 notifies each processing unit R1-Rn whether use is allowed. As a consequence, display on a plurality of areas by each processing unit R1-Rn can be appropriately controlled.

2. First Embodiment 2.1 General Configuration

Figure 2:
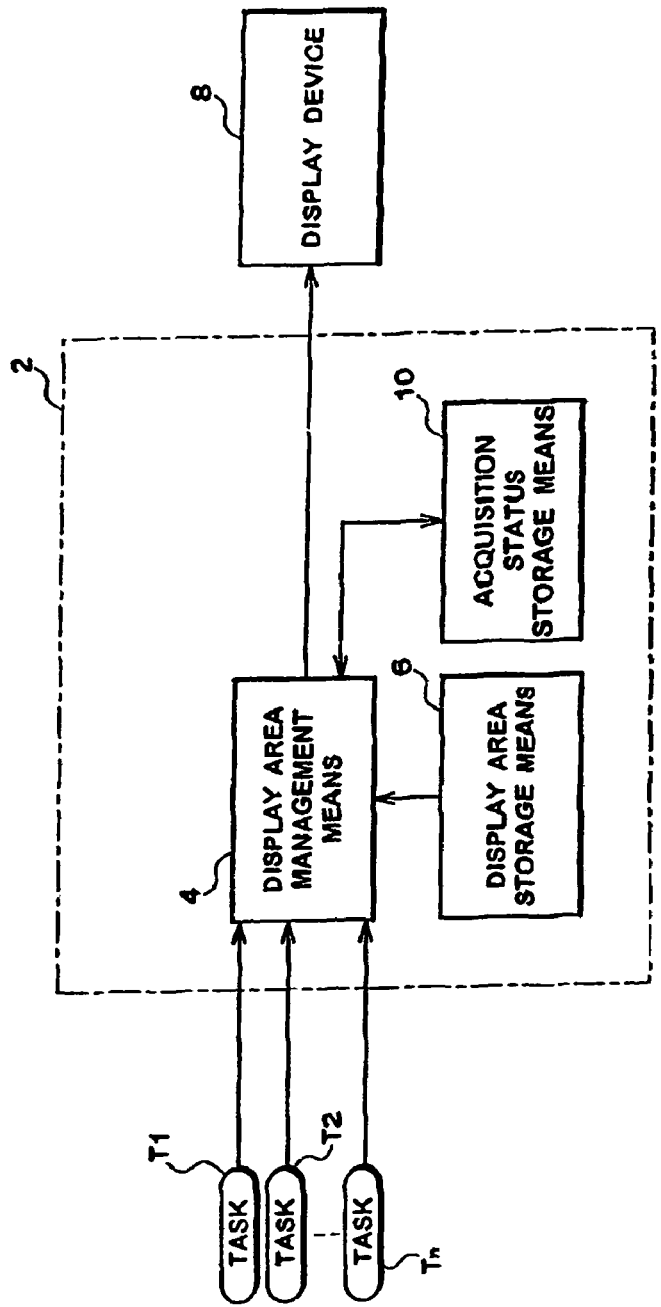
FIG. 2 is a drawing depicting a general configuration of the display control device 2 according to the first embodiment.

FIG. 2 shows a general configuration of a display control device 2 as an embodiment of the present invention. In this embodiment, acquisition status storage means 10 connected to the display area management means 4 is disposed. The acquisition status storage means 10 stores the acquisition status correlating a display area and tasks T1-Tn which are processing units which acquired the display area. When a display area acquisition request is received from one of the tasks T1-Tn, the display area management means 4 judges whether the display area has been acquired by another task based on the storage content of the acquisition status storage means 10. If the display area has been acquired by another task, the task is not allowed to use the display area. If the display area has not been acquired by another task, the task is allowed to use the display area.

2.2 Example of Application to Digital Broadcasting Receiver

Figure 3:
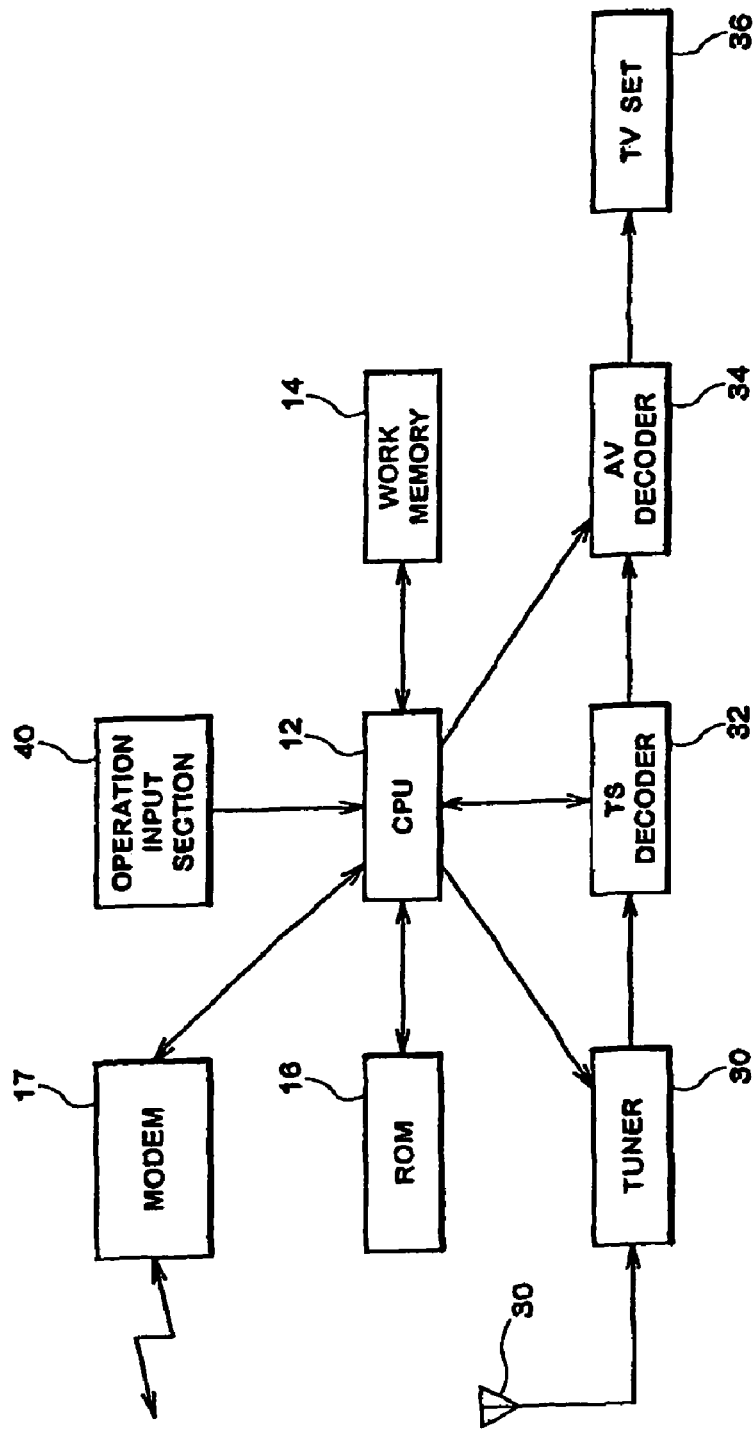
FIG. 3 is a drawing depicting a hardware configuration when the display control device in FIG. 2 is applied to a digital broadcasting receiver.

FIG. 3 shows a hardware configuration when the display control device shown in FIG. 2 is applied to a digital broadcasting receiver. In this example, each function shown in FIG. 2 is implemented by CPU 12.

In satellite digital broadcasting and ground wave digital broadcasting, a plurality of services are multiplexed and sent as a transport stream. The radio wave captured by an antenna 38 is sent to a tuner 30. The tuner 30 selects and demodulates the transport stream carrying the desired service according to the control of the CPU 12. The demodulated transport stream is sent to a transport decoder (TS decoder) 32. The transport decoder 32 selects the desired service from the transport stream according to the control of the CPU 12, and outputs it to an audio video decoder (AV decoder) 34. The AV decoder receives the data, decompresses the compressed data, carries out D/A conversion, and outputs video composite signals (e.g. NTSC signals).

Figure 4:
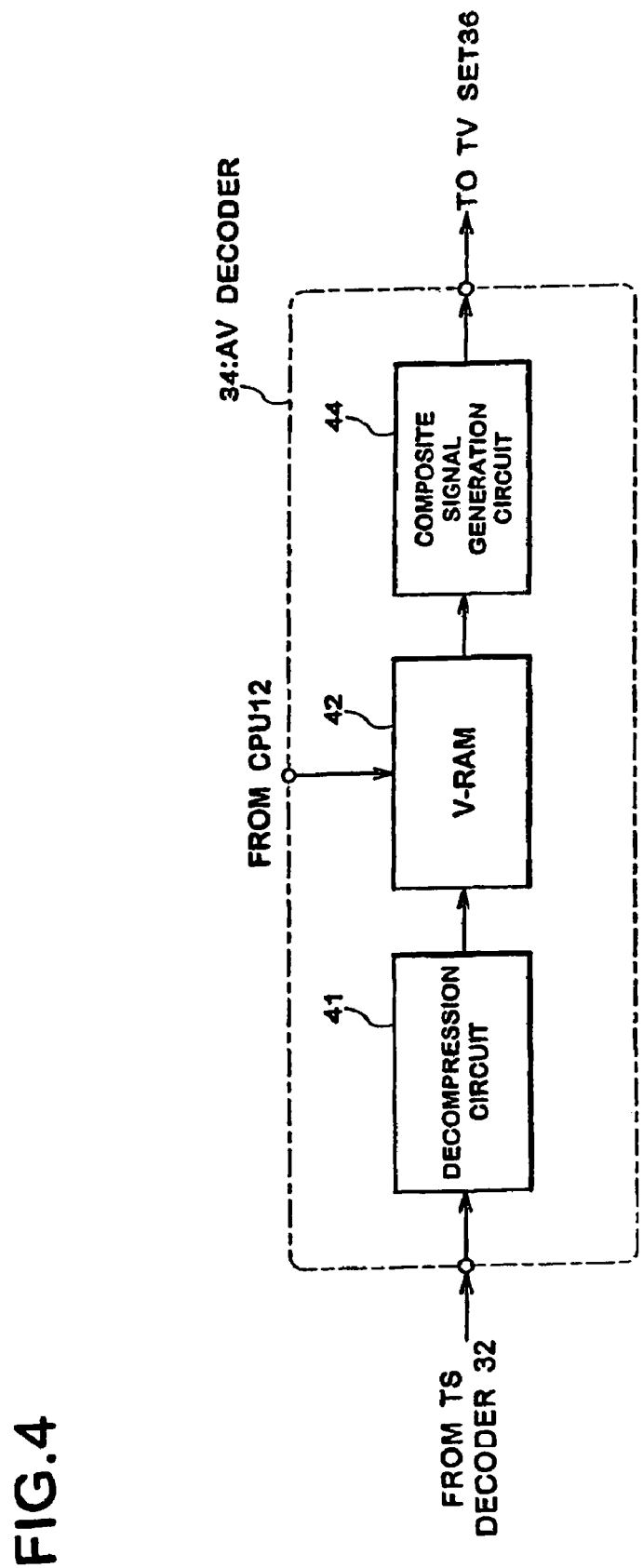
FIG. 4 is a drawing depicting details of an AV decoder.

FIG. 4 shows details of the AV decoder 34. The decompression circuit 41 decompresses the output from the TS decoder 32 and sends it to a video RAM 42. In data broadcasting, display content is controlled by overwriting the V-RAM 42 from the CPU 12. A composite signal generation circuit 44 converts the content of the V-RAM 42 from digital to analog so as to convert to video composite signals.

Referring to FIG. 3, A TV set 36, which is a display device, receives the video composite signals and outputs images and sound. A modem 17, which is a communication control circuit, is used for communication with the outside via telephone lines.

The CPU 12 controls the above mentioned receive processing according to a station selection application (program) recorded in a ROM 16. The CPU 12 judges which service is to be received based on the input by the user, which is input from an operation input section 40. The operation input section 40 may be a receiving part of a remote controller (not illustrated) or operation buttons disposed on the receiver main body.

In the ROM 16, such tasks as a caption application, a program schedule application, a program reservation application, a data receiving application, and a system setting application have been recorded, in addition to the station selection application. Also in the ROM 16, a display control program and a display area definition table have been recorded. A work memory 14 functions as a work area of the CPU 12.

Figure 5:
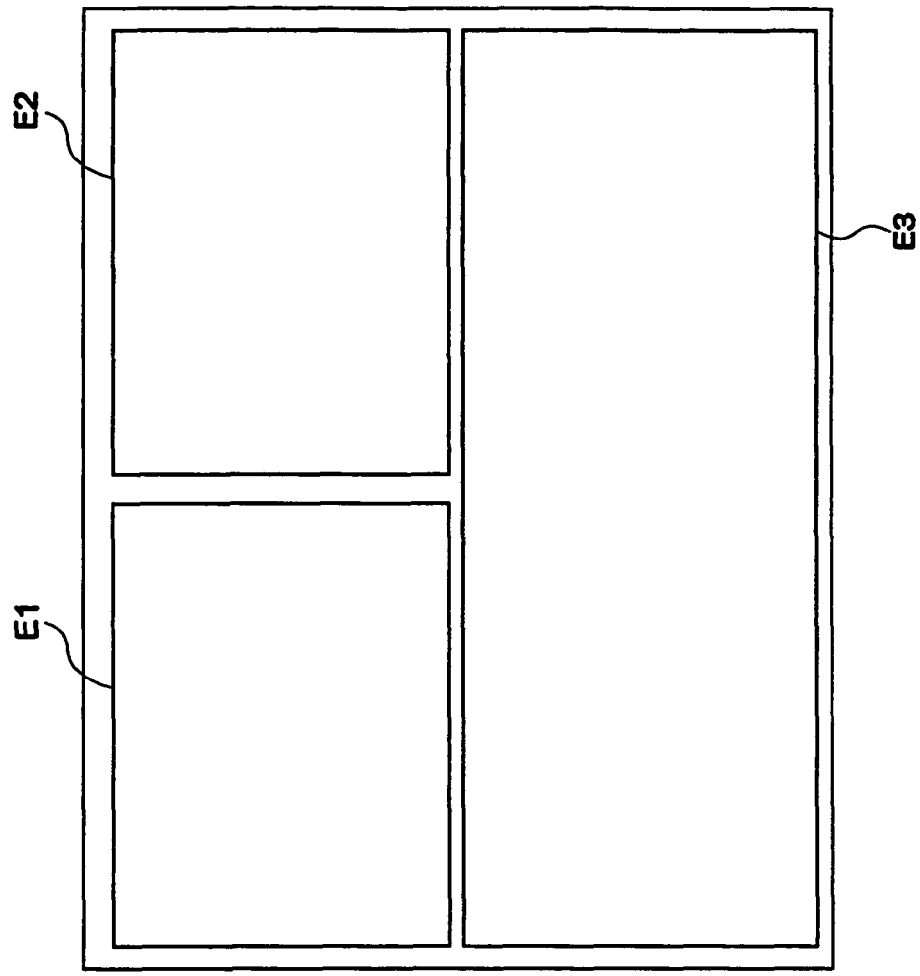
FIG. 5 is a drawing depicting an example of defining a display area.

FIG. 5 shows a display area definition example on the screen of the TV set 36. In this embodiment, each display area E1-E3 is defined so as not to overlap with each other. In the ROM 16, a display area definition table (display area storage means) for indicating the definitions of each display area E1-E3 has been recorded, as FIG. 6 shows. In this embodiment, the coordinates are indicated by display dots, where the upper left corner of the screen is (0, 0), the lateral direction is X and the longitudinal direction is Y. The lower right corner is (679, 339).

The work memory 14 has an acquisition status storage table for recording acquisition status correlating each area E1-E3 and tasks which acquired each area, as FIG. 7A shows.

Figure 8:
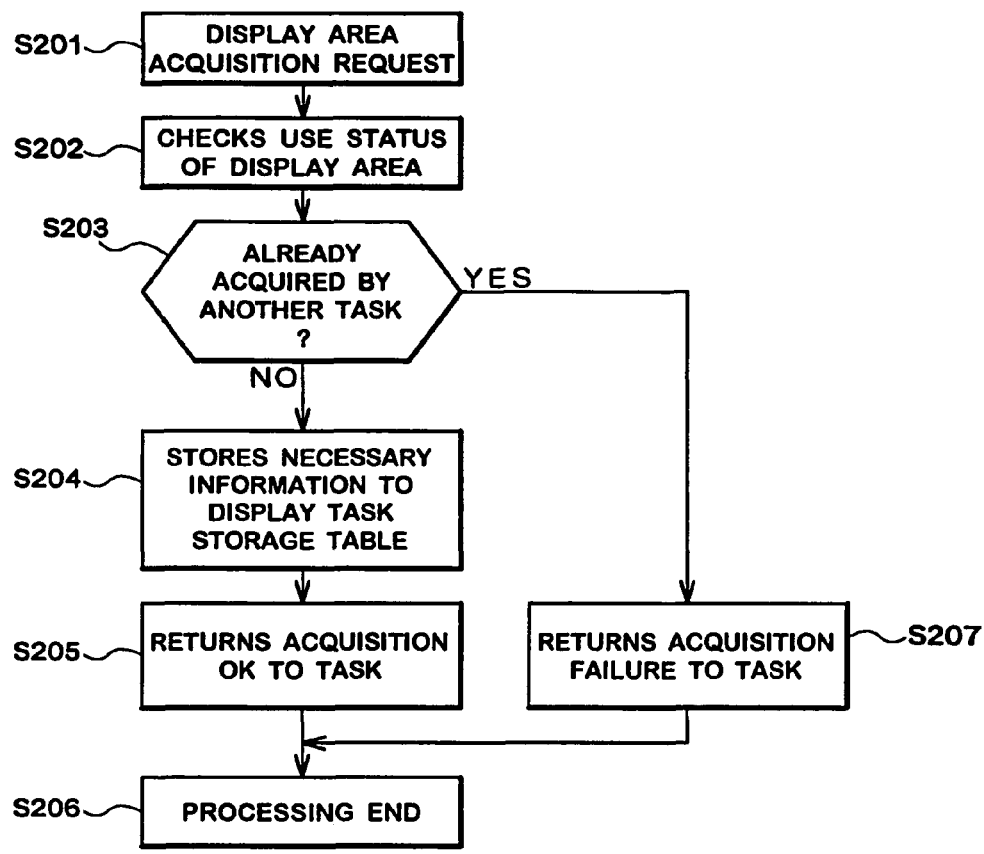
FIG. 8 is a flow chart showing an acquisition request processing portion of a display control program in accordance with the first embodiment.

FIG. 8 shows a flow chart of an acquisition request processing portion (display area management means) of the display control program recorded in the ROM 16. Now, with reference to this flow chart, the case when a data receiving application (task T1) executes display processing for the display area E2, will be described. The data receiving application is an application for receiving data broadcasting (e.g. weather forecasting data) and executing display based on this data. At first the data receiving application sends a request to acquire the display area E2 to the CPU 12. The CPU 12 receives this request and starts the display control program shown in FIG. 8 (Step S201).

Then the CPU 12 reads the display task storage table in the work memory 14, and acquires a use status of the requested display area E2 (Step S202). Based on the obtained status, the CPU 12 judges whether the requested display area E2 has been acquired by another application (task) (Step S203). Here, the display area E2 has not been acquired by any other task, as FIG. 7A shows. Therefore the processing advances to Step S204.

In Step S204, the data receiving application (task T1) is stored correlating to the display area E2 of the display task storage table. FIG. 7B shows the display task storage table after storing the task T1.

Figure 9:
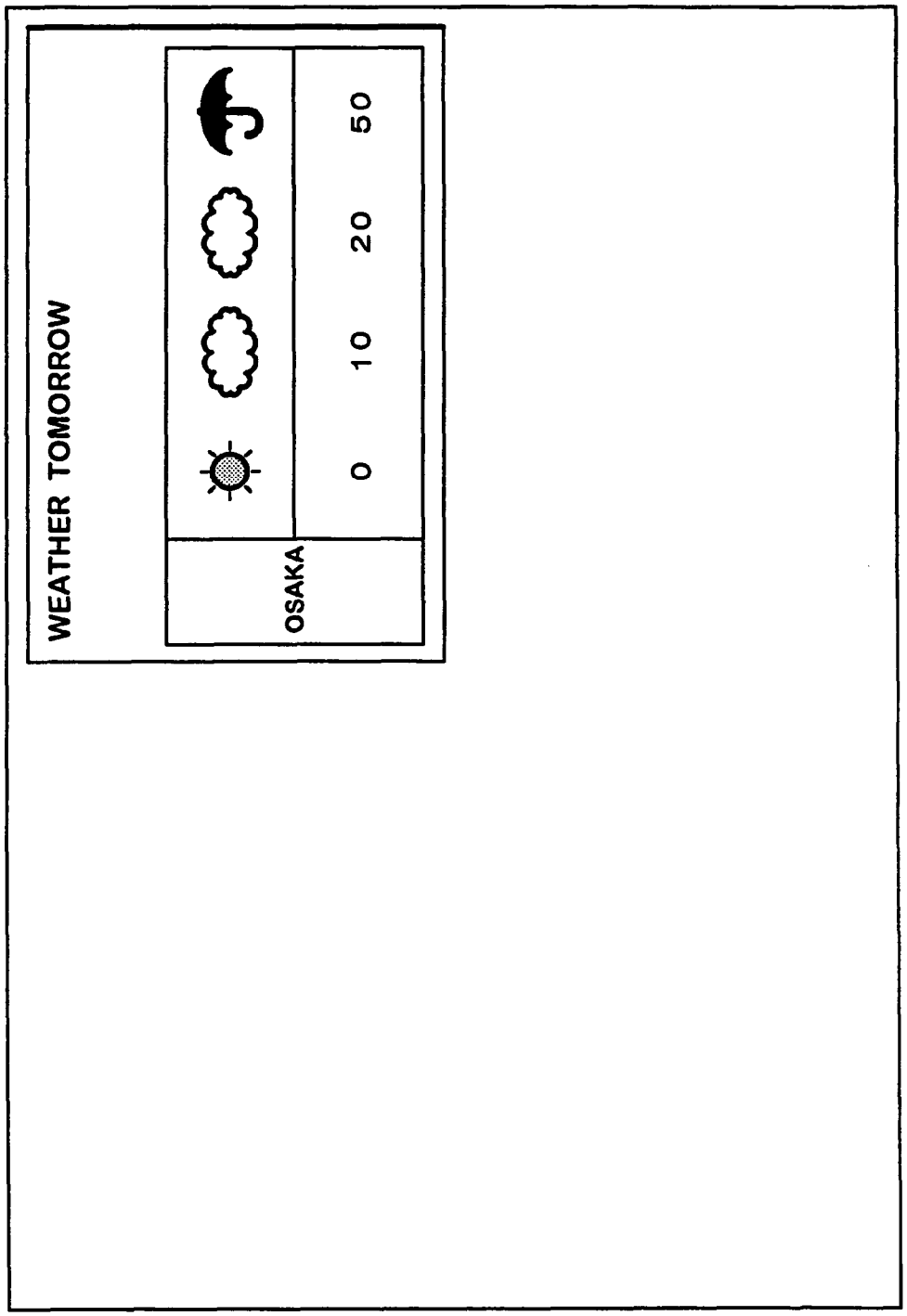
FIG. 9 is an example of a screen display on TV set 36.

Then the CPU 12 notifies the data receiving application (task T1) to allow use of the requested display area E2. In this way, the data receiving application (task 1) acquires a display right for the display area E2. The data receiving application which acquired the display area E2 executes display processing for the area. In other words, according to the data receiving application, the CPU 12 overwrites the V-RAM 42 based on the received content of the data broadcasting, and displays data broadcasting, as shown in FIG. 9.

A case when a program schedule application (task T3) requests acquisition of the display area E2 again in the above status will be explained. The program schedule application is an application to receive and display an electronic program schedule (EPG). In this case as well, the display control program shown in FIG. 8 is started by the acquisition request from the program schedule application (task T3) (Step S201). The CPU 12 recognizes that the requested display area E2 has already been acquired by the data receiving application (task 1) based on the acquisition status storage table (see FIG. 7B). Therefore the processing advances from Step S203 to S207. In this embodiment, two tasks are not allowed to use the same display area, so the CPU 12 notifies the program schedule application (task T3) that the display area E2 cannot be acquired (Step S207). The program schedule application (task T3) receives this message, and selects whether to wait until the display area E2 is released or to request acquisition of another display area, or to give up display at this time.

Figure 10:
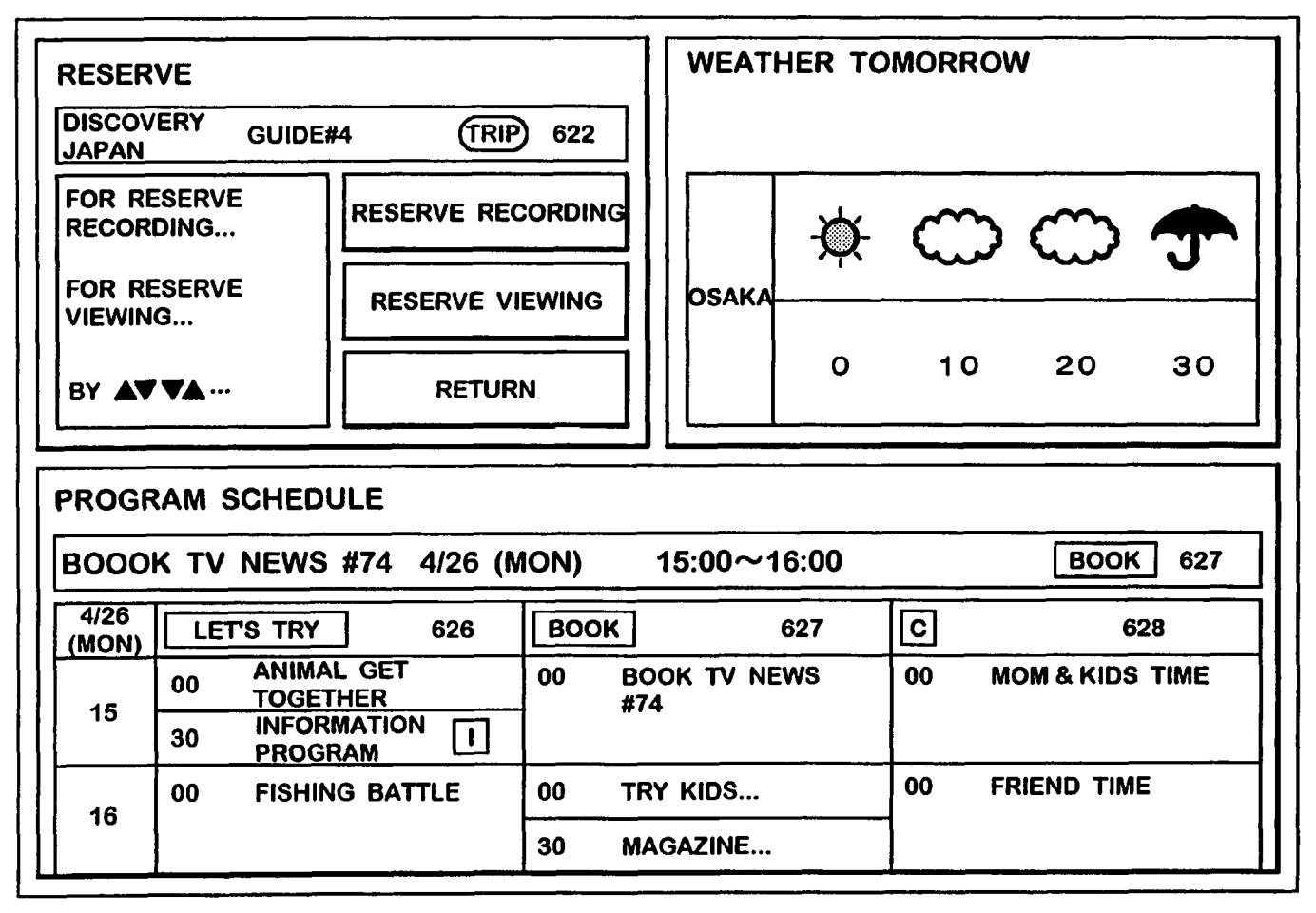

FIG. 10 shows an example of the screen display when the program schedule application requests to acquire a display area E3 and a program reservation application requests to acquire a display area E1 in the above status. According to this embodiment, each application is allowed use of a display area such that disorder is not caused by e.g. overlapping of a display by each application, therefore display by a plurality of applications can be appropriately executed, as shown in FIG. 10.

Figure 11:
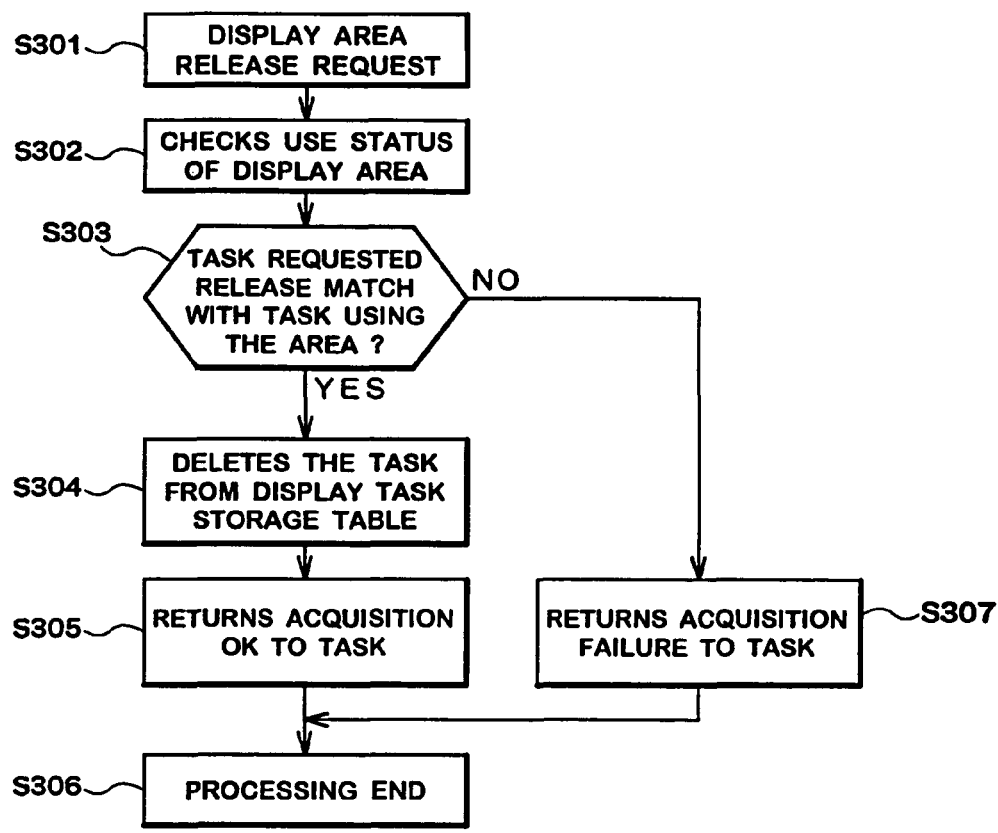
FIG. 11 is a flow chart showing a release request processing portion of the display control program in accordance with the first embodiment.

When the above data receiving application (task T1) which acquired the display area E2 ends the display processing on the display area, the data receiving application (task T1) requests release of the display area E2 to the CPU 12. FIG. 11 shows a flow chart of a processing program (release request processing) in this case. The CPU 12 receives the release request and starts processing shown in FIG. 11 (Step S301). At first, the CPU 12 obtains the working status of the display area E2, for which release was requested, from the acquisition status storage table (Step S302). Since the content of the acquisition status storage table at this point is as shown in FIG. 7B, the CPU 12 recognizes that the display area E2 has been acquired by the data receiving application (task T1).

Then the CPU 12 judges whether the task which requested the release has actually acquired the display area. This judgment is made based on whether the task which requested the release of the display area matches the task which has acquired the display area (step S303). This judgment is made to prevent a task which has not acquired the display area from requesting an incorrect release. When the tasks do not match in Step S303, the display area is not released, and failure of the release is notified to the task which requested the release (Step S307).

Since the data receiving application (task T1) which requested release of the display area E2 has actually acquired the display area E2 here, processing advances to Step S304. In Step S304, the task T1 which was stored correlating to the display area E2 in the acquisition status storage table is deleted. As a result, the content of the acquisition status storage table becomes the status shown in FIG. 7A. Therefore if a new acquisition request for the display area E2 is received, use can be allowed.

After deleting the task from the acquisition status storage table, the CPU 12 notifies the data receiving application (task T1) that the area is released (Step S305).

In the above embodiment, when display area acquisition requests are received from a plurality of applications (tasks), it is judged whether the display areas subject to the acquisition request are the same areas, and if they are, then the task which requested the acquisition first is allowed use of the display area. In other words, if a plurality of tasks request acquisition for the same display area, it is judged that coexistence is impossible, and if the tasks request acquisition for different areas, then it is judged that coexistence is possible.

3. Second Embodiment 3.1 General Configuration

Figure 13:
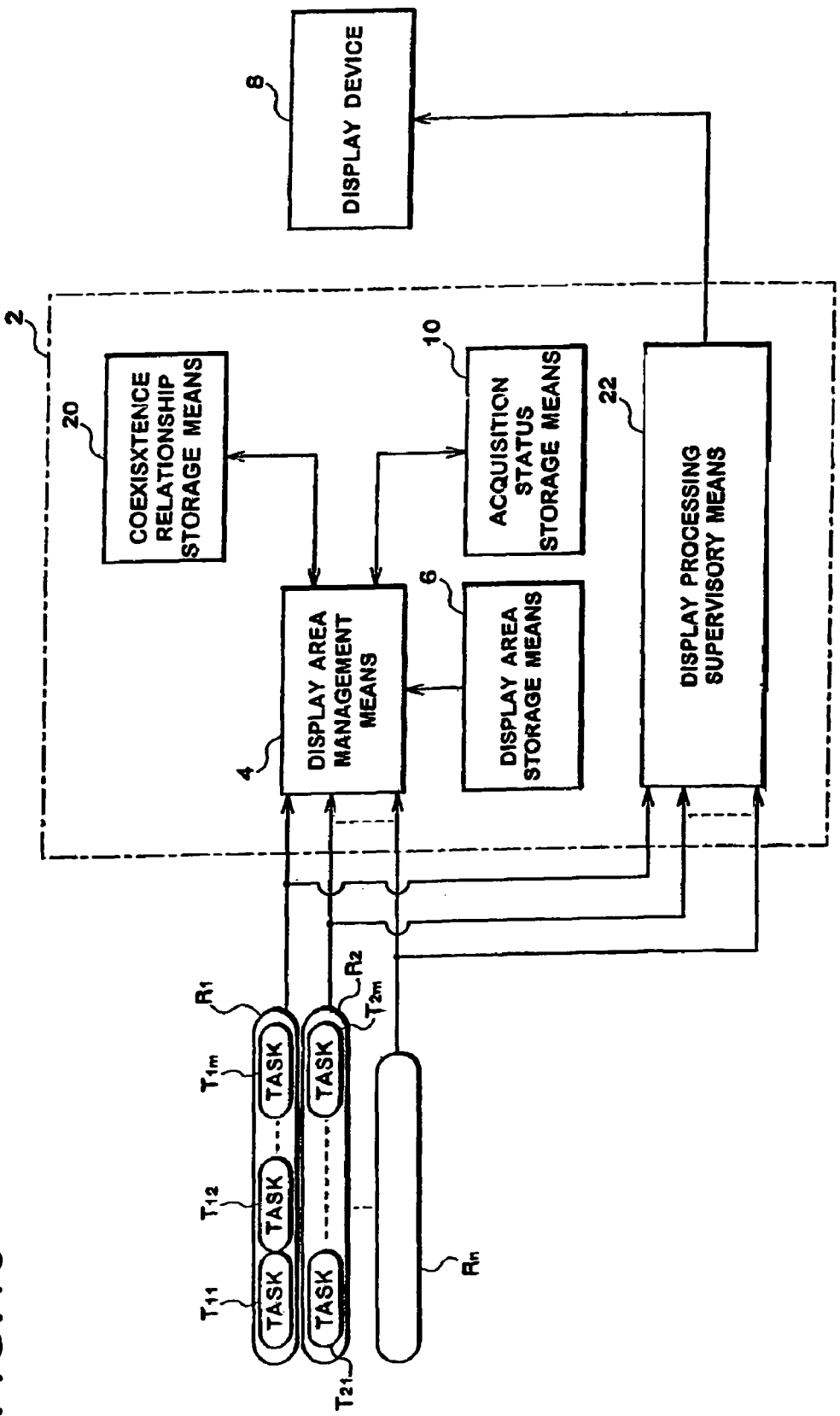
FIG. 13 is a drawing depicting a general configuration of the display control device 2 according to the second embodiment.

FIG. 13 shows a general configuration of a display control device 2 according to the second embodiment of the present invention. In this embodiment, coexistence relationship storage means 20 is disposed. The coexistence relationship storage means 20 stores the coexistence relationship information to indicate whether a plurality of display areas can coexist. The display area management means 4 judges whether the display areas desired by the acquisition requests from each processing unit R1-Rn can coexist, based on the coexistence relationship information of the coexistence relationship storage means 20. If coexistence is impossible, the processing unit which requested acquisition first is allowed use of the display area.

A display processing supervisory means 22 judges whether each display processing by each processing unit R1-Rn is for a display area where use of each display processing is allowed. If the display processing is for a display area where use is not allowed, the display processing is not accepted.

In the first embodiment, one task corresponds to one processing unit. In the second embodiment, however, the case where one processing unit R1 includes a plurality of tasks T11-T1m will be explained. For example, a program schedule application as a processing unit includes three tasks, that is, 1) task 1, which sends operation input from an operation input section 40 to task 2 or task 3 depending on the situation, 2) task 2 which displays the program schedule on screen, and 3), task 3 which displays the details of the program on screen.

A display area acquisition request is sent from each processing unit R1-Rn, and use is allowed for each processing unit R1-Rn. An acquisition request may be sent from each processing unit R1-Rn independently, or be sent from a specific task of each processing unit R1-Rn as a representative of the processing unit. The latter case will be explained below.

3.2 Embodiment Applied to a Digital Broadcasting Receiver

The case when the display control device 2 in FIG. 13 is applied to a digital broadcasting receiver will be explained. The hardware configuration is the same as in FIG. 3. In the ROM 16, however, coexistence relationship information is also recorded, in addition to definitions of the display areas and the display control program.

Figure 14:
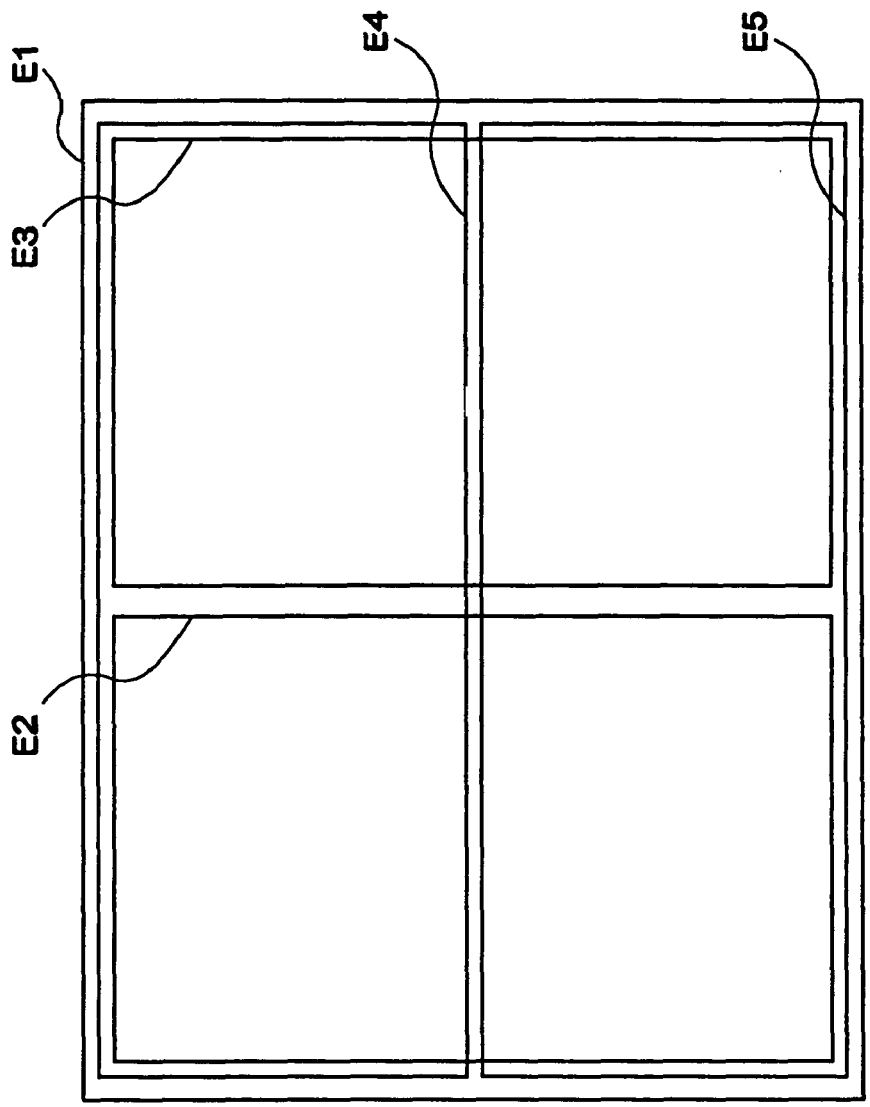
FIG. 14 is a drawing depicting a display area definition example.

FIG. 14 shows the definitions of the display areas in this embodiment. In this embodiment, the display area E1 for the entire screen, the display area E2 for the left half, the display area E3 for the right half, the display area E4 for the upper half, and the display area E5 for the lower half are defined. This definition content is stored in the ROM 16 as a display area definition table, as shown in FIG. 15. Also, as FIG. 16 shows, the work memory 14 stores the acquisition status storage table which indicates the correspondence between a display area and the processing unit which acquires this area.

In this embodiment, a key number is assigned to a processing unit which is allowed to display, as mentioned later. This key number is also stored in the acquisition status storage table.

FIG. 17 shows the coexistence relationship table stored in the ROM 16. In this embodiment, areas cannot coexist if they overlap. In FIG. 17, display areas which cannot coexist are recorded for each display area, but display areas which can coexist may be recorded.

Figure 18:
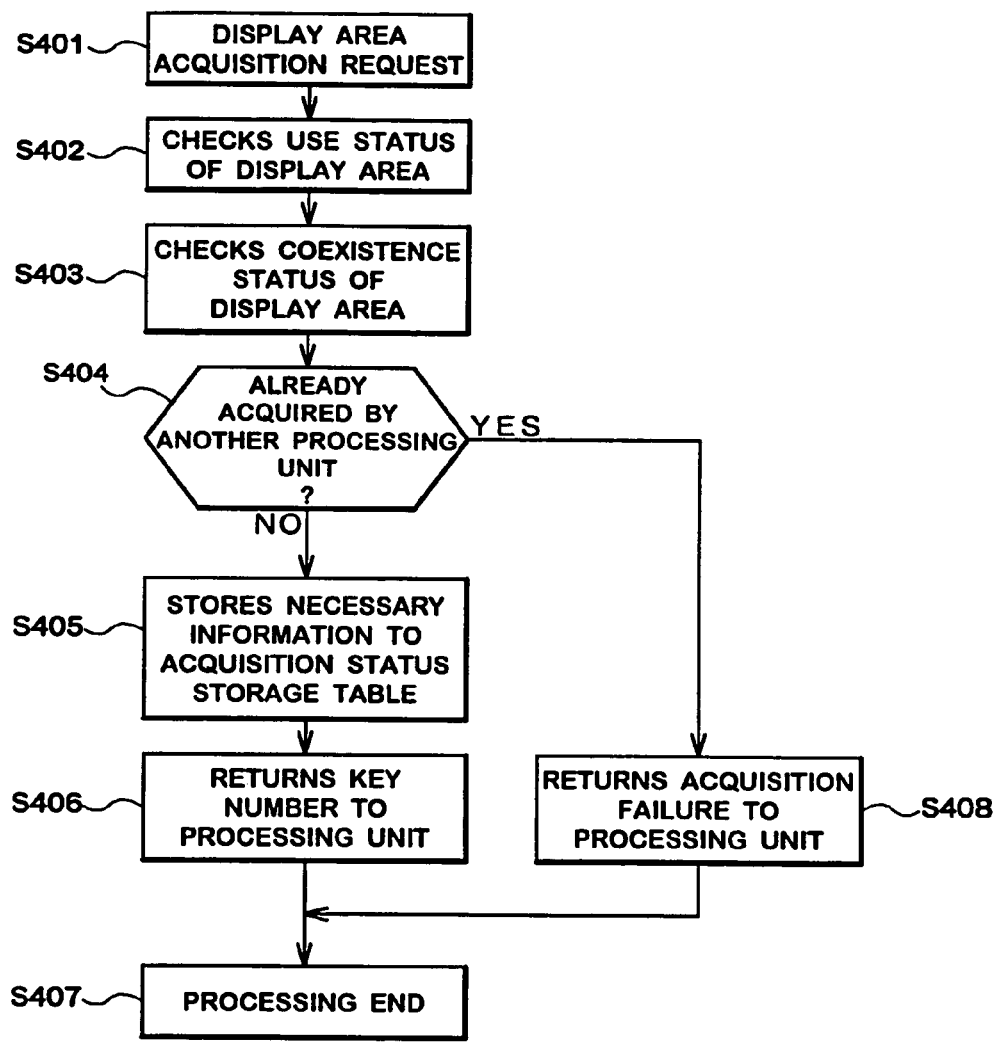
FIG. 18 is a flow chart showing an acquisition request processing portion of a display control program in accordance with the second embodiment.

FIG. 18 shows a flow chart of the acquisition request processing portion of the display control program recorded in the ROM 16. Processing when the processing unit R2 requests acquisition of the display area E3 while the display area E2 has been acquired by the processing unit R1, as shown in FIG. 16B, will be explained. In this explanation, the processing unit R1 is assumed to be the program schedule application and the processing unit R2 to be the data receiving application. In this case, the program schedule application, which is the processing unit R1, is currently executing display in the display area E2, as shown in FIG. 19.

When the acquisition request is received from the task T21 (for example, a task for displaying the content of data broadcasting on screen), which represents the data receiving application (processing unit R2), the CPU 12 starts the processing shown in FIG. 18 (Step S401). Then the CPU 12 refers to the acquisition status storage table, and obtains data on which processing unit has acquired each display area (Step S402). In this case, the display area E2 has been acquired by the program schedule application (processing unit R1) and the other display areas are open.

Then referring to the coexistence relationship table in FIG. 17, the CPU 12 obtains data on areas which cannot coexist with the display area E3 requested by the data receiving application (processing unit R2) (Step S403). In this case, the display areas E1, E4 and E5 are the areas which cannot coexist.

Then the CPU 12 judges whether the display area E3 for which acquisition is requested has been acquired by another processing unit. Also the CPU 12 judges whether one of the display areas E1, E4 and E5, which cannot coexist with the requested display area E3, has been acquired by another processing unit. If one of these areas E3, E1, E4 and E5 has been acquired by another processing unit, the CPU 12 returns an acquisition failure notice to the task which sent the request (Step S408).

In this case, all the display areas E3, E1, E4 and E5 are open, so processing advances to Step S405. In Step S405, the processing unit R2 and the key number, corresponding to the display area E3, are stored in the acquisition status storage table (see FIG. 16C). The CPU 12 sends the key number to the task T21 representing the data receiving application (processing unit R2) to notify that use of the display area is allowed (Step S406). The task T21 receives the key number and notifies that the use of the display area E3 is allowed along with the key number to the other tasks T22-T2n (for example, a task for displaying the main menu, and a task for displaying the sub-menu) belonging to the data receiving application (processing unit R2). In this way, use of the display area E3 is allowed to the data receiving application (processing unit R2). In this embodiment, a key number, including date and time when use is allowed, is generated and assigned. In this case, the key number "3205151307" is generated as area number "3", processing unit number "2", month "05", day "15", hour "13" and minute "07". The key number may be generated by another encryption processing.

Figure 20:
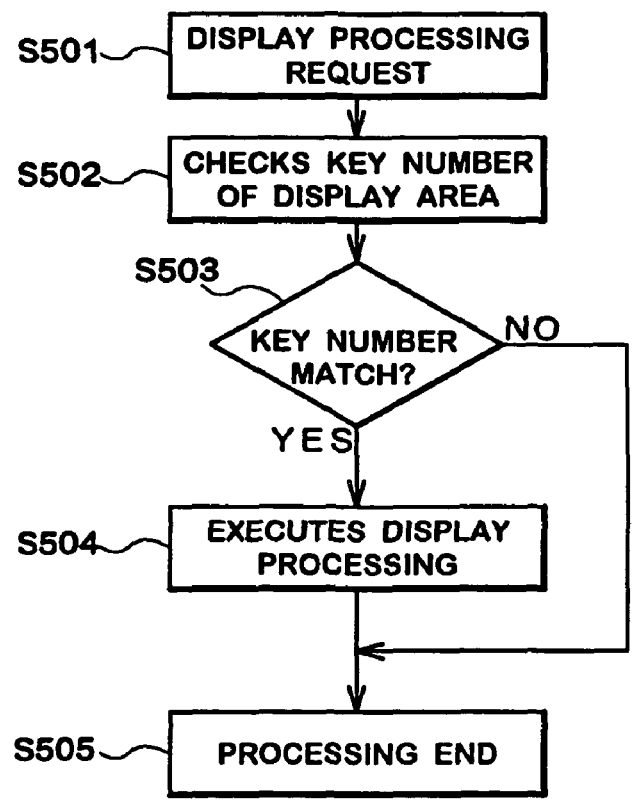
FIG. 20 is a flow chart showing a supervisory processing portion of the display control program in accordance with the second embodiment.
Figure 21:
FIG. 21 is an example of a display of a program schedule and weather forecast.

In this embodiment, it is supervised whether the display processing instructions sent from each task belonging to each processing unit is for the display area for which use is allowed. FIG. 20 shows a flow chart of the supervisory processing program (display processing supervisory means). Supervision of display processing by the task T22 belonging to the data receiving application (processing unit R2) which obtained the display area E3 will be explained below.

The task T22 of the data receiving application notifies the requesting display area E3, the assigned key number "3205151307" and the display content (for example, "straight line, x1=10, y1=20, x2=10, y2=80") to the CPU 12. Receiving this, the CPU 12 starts the processing in FIG. 20 (step S501). At first, the CPU 12 refers to the acquisition status storage table in Step S502, and recognizes that the key number of the display area E3 is "3205151307" (see FIG. 16C). Then the CPU 12 judges whether the key number notified by the task T22 which requested display processing and the key number of the acquisition status storage table match (Step S503).

When they do not match, the CPU 12 does not execute display processing regarding that the task belonging to a processing unit which is not allowed use of the display area attempts invalid display processing. In other words, the display content is not displayed.

In this case, the key number "3205151307" matches, therefore the CPU 12 judges the display processing request as valid, and executes the display processing for the display area E3 (Step S504). As a result, the display content is displayed. This display processing may be executed by the CPU 12, or by another CPU or circuit.

In this way, the program schedule application uses the area E2 at the left, and the data receiving application uses the area E3 at the right. If the program schedule application attempts display processing for the area E3, or if the data receiving application attempts display processing for the area E2, then the display processing is disabled by the supervisory processing program. Thus the program is supervised so as to maintain an appropriate display by disabling display processing by a task belonging to a processing unit which is not allowed use of the display area.

Next, the case when the caption application (processing unit R3) requests acquisition of the upper half display area E4 while the left half display area E2 has been acquired by the program schedule application (processing unit R1) (see FIG. 16B) will be explained.

When the acquisition request is received, the CPU starts the processing shown in FIG. 18 (Step S401). Since another processing unit has acquired the display area E2, which cannot coexist with the display area E4 in Step S404, the processing advances to Step S408. In Step S404, the CPU 12 returns an acquisition failure notice to the processing unit R3. In other words, in this embodiment, the left half display area E2 and the upper half display area E4 cannot coexist since they partially overlap.

In the above case, a key number is not assigned to a task belonging to the processing unit R3, therefore display processing for the display area 4 cannot be executed. Even if display processing is attempted, the display processing is disabled by the supervisory processing program shown in FIG. 20.

In this embodiment, a key number is encrypted by including such elements as hour and minute. Therefore even when use of the same display area is allowed, the key number may be different for each assignment. In the case of the status shown in FIG. 16C, for example, when the processing unit R1 releases the display area E2 and the processing unit R4 is allowed use of the display area, a key number different from the one for processing unit R1, that is, "2105151209", is assigned. As a consequence, even if a task belonging to the processing unit R1 attempts display processing for the display area E2 using the old key number, "2105151305", the display processing is disabled.

3.3 Handling of Task Attempted Invalid Processing

Figure 22:
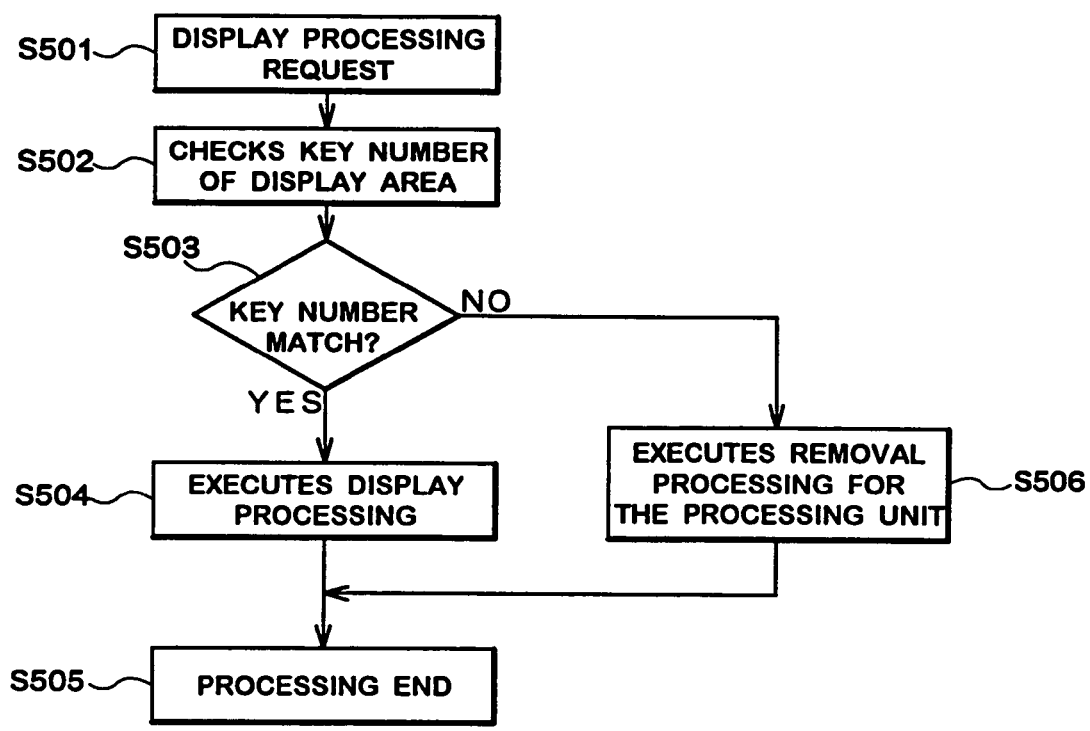
FIG. 22 is a flow chart showing a supervisory processing portion of the display control program in accordance with the second embodiment.

In the above mentioned case, display processing by a task is not executed if key numbers do not match. However, as Step S506 in FIG. 22 shows, subsequent processing may be completely disabled for the processing unit which requested the display processing. In other words, regarding the processing unit as a processing unit which attempted invalid processing, the display area which the processing unit has acquired is forcibly released, resources the processing unit is using are forcibly released, and information on the processing unit recorded in the kernel which is performing task control is deleted, so as to remove the processing unit. In this way, invalid processing by an invalid processing unit can be prevented by removing the processing unit which attempted invalid processing.

4. Third Embodiment

4.1 Example When Overlapped Areas are Not Allowed to Coexist

In accordance with the above mentioned first embodiment and second embodiment, when a plurality of processing units request acquisition of display areas which cannot coexist, the processing unit which sent an acquisition request first is allowed use of the display area. However, it is also acceptable that priority be assigned to each display area, and a processing unit which requested a display area which has the highest priority among the plurality of processing units which requested acquisition is allowed use of the display area.

An embodiment using this type processing will be explained below. For convenience of explanation, the second embodiment applied to a digital broadcasting receiver is basically used for explanation.

In the ROM 16 (FIG. 3), a display area priority table, as shown in FIG. 23, has been recorded. The display area priority table defines priority for each display area. In this embodiment, the smaller the number assigned as priority the higher the priority.

Figure 24:
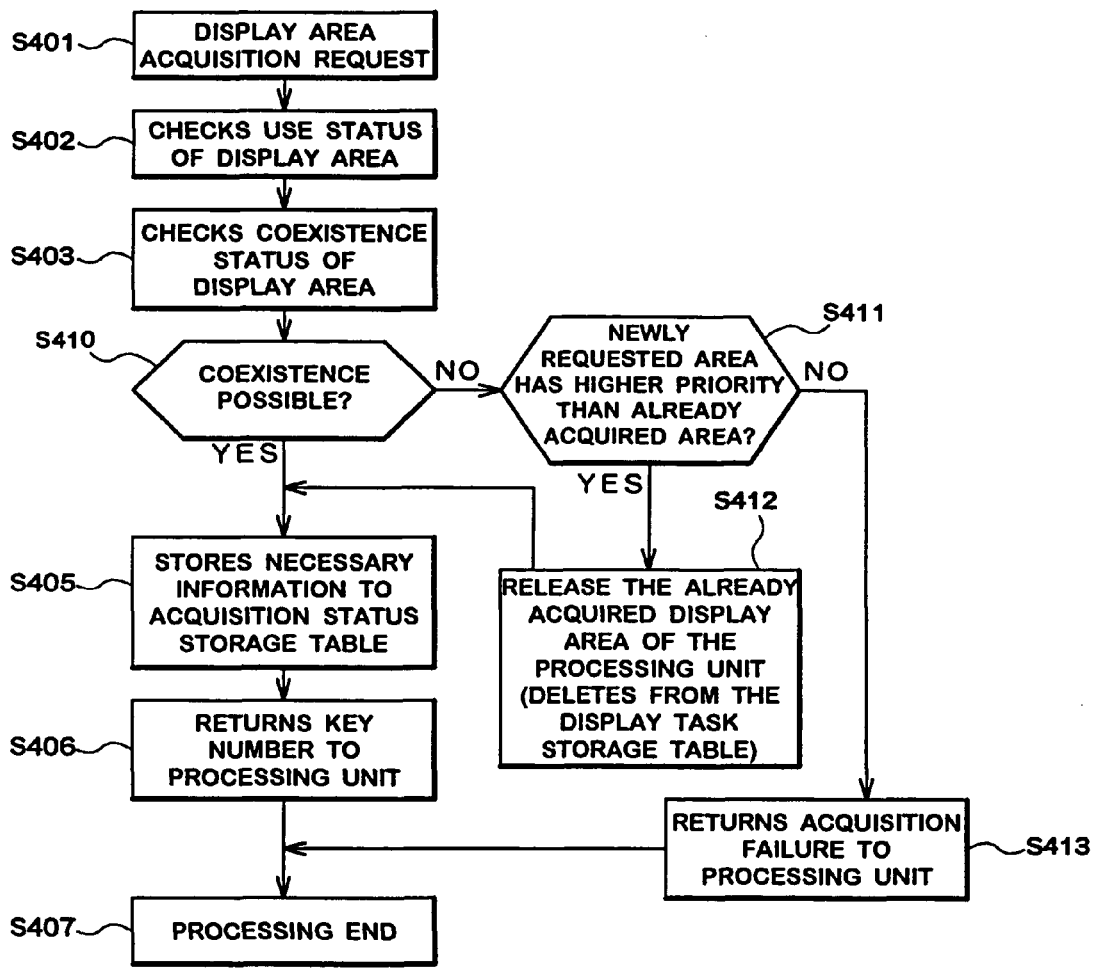
FIG. 24 is a flow chart showing an acquisition request processing portion of a display control program in accordance with the third embodiment.

FIG. 24 shows a flow chart of the acquisition request processing portion of the display control program in accordance with the present embodiment. The following explanation is based on the case when the processing unit R3 requests acquisition of the display area E1 (entire area) while the processing unit R1 has acquired the display area E2 (left half area), and the processing unit R2 has acquired the display area E3 (right half area), as shown in FIG. 16C.

When the acquisition request from the processing unit R3 is received, the CPU 12 starts the processing shown in FIG. 24 (Step S401). Then referring to the acquisition status storage table in FIG. 16C and the coexistence relationship table in FIG. 17, the CPU 12 judges whether the display area E1 requested by the processing unit R3 can coexist with the areas which have already been acquired (Steps S402, S403, S410). Since the display E1 cannot coexist with the display area E2 and the display area E3, the processing advances to Step S411.

In Step S411, referring to the display area priority table in FIG. 23, the CPU 12 judges whether the newly requested display area has a higher priority than the display areas which have been acquired and cannot coexist with the newly requested display area. If the priority is not higher (priority is lower or the same), an acquisition failure notice is sent to the processing unit which requested acquisition (Step S413). Since priority of the display area E1 requested by the processing unit R3 is "1", and priority of the display areas E2 and E3 which have been acquired is "2", the display area E1 has the higher priority. Therefore processing advances to Step S412.

In Step S412, the display areas E2 and E3 which have been acquired are released. In this case, the processing unit R1 and R2 are deleted from the display area storage table. Then processing advances to Steps S405 and S406, and the processing unit R3 is allowed use of the display area E1. As a result, use of the screen allowed to processing units R1 and R2 is changed to use of the entire screen allowed to the processing unit R3.

In this way, in accordance with the present embodiment, when acquisition of display areas which cannot coexist is requested, use is allowed to a processing unit which requested a display area having a higher priority.

4.2 Example When overlapped Areas are Allowed to Coexist

In the above mentioned case, overlapped areas are not allowed to coexist. However, overlapped areas may be allowed to coexist, where for the overlapped portion, a display area having a higher priority is displayed with priority.

Figures 25, 26:
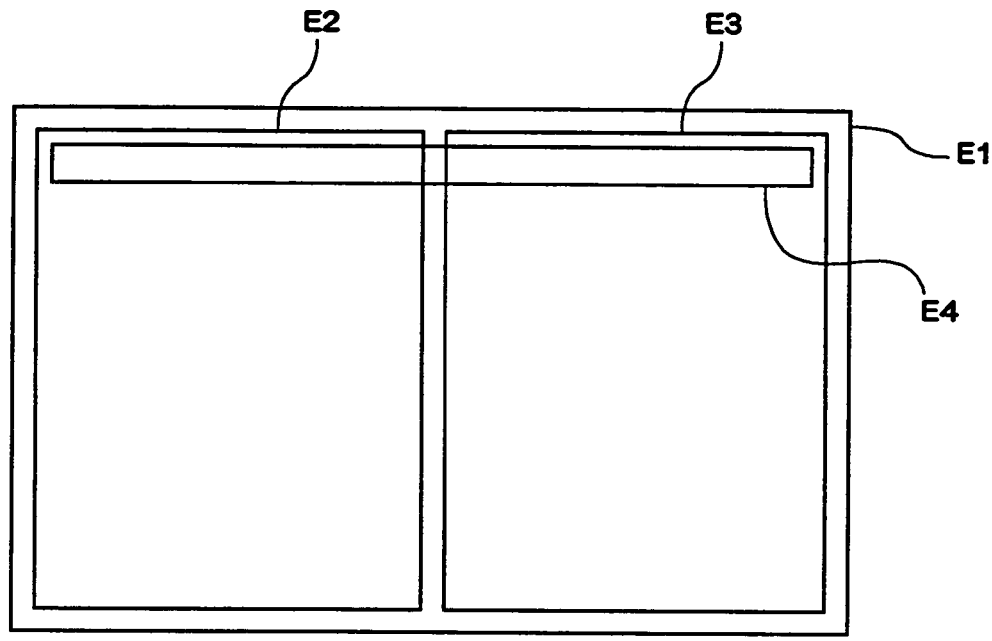
FIG. 25 is a display area definition example on a screen.
FIG. 26 is a drawing showing a coexistence relationship table.

In this case, FIG. 25 shows the definition of the display areas, FIG. 26 shows a coexistence relationship table, and FIG. 27 shows a display area priority table. The flow chart of the acquisition request processing is the same as FIG. 24.

Assume that an urgent display application requests acquisition of the top part display area E4 while an application is using the display area E1 on the entire screen. In this case, the urgent display application is allowed to use the display area E4 since the area E4 can coexist with the area E1.

Figure 28:
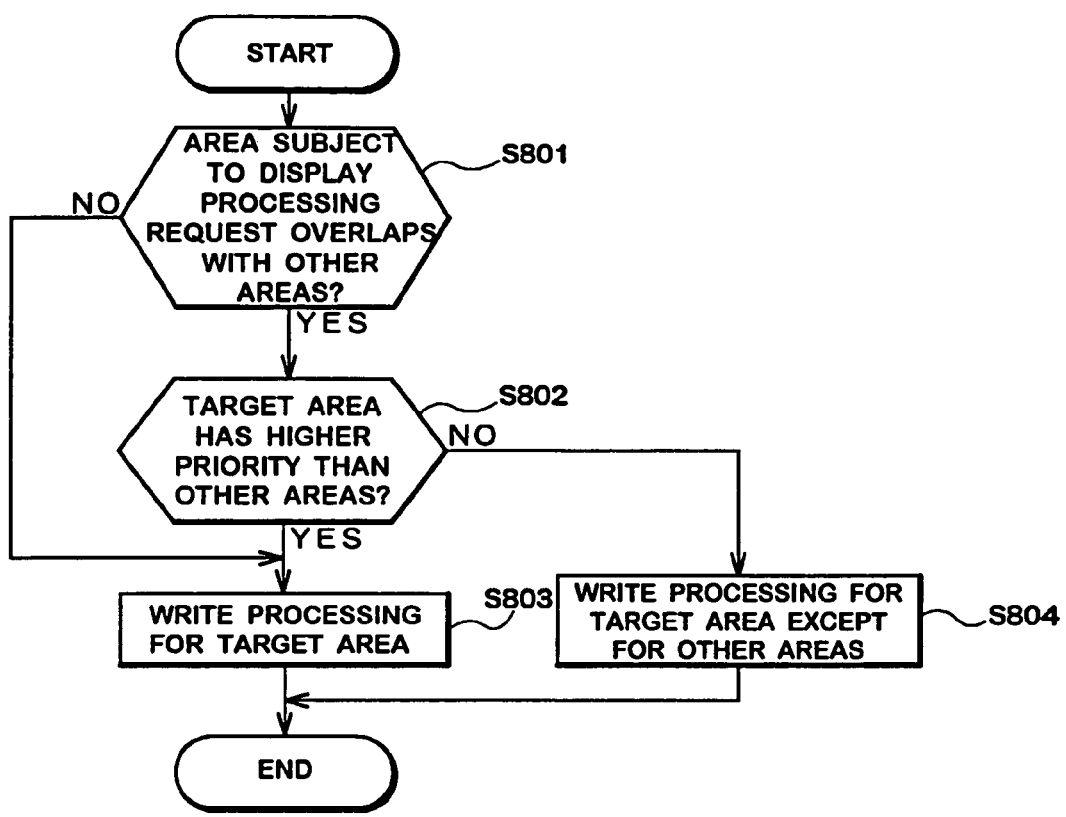
FIG. 28 is a flow chart of a program for display processing.

FIG. 28 shows a flow chart of the display processing program. It is preferable to provide the display processing program as a part of the operating system (OS). The case when an urgent display application which is allowed to use the display area E4, as mentioned above, executes display processing for the display area E4, will be explained as an example. At first, the display processing request sent by the urgent display application is judged whether it is a valid request by the supervisory processing shown in FIG. 22. If judged as valid because key numbers match, the display processing request is sent to the display processing program of the OS in Step S504 in FIG. 22.

When the display processing request is received, CPU judges whether the target area of the display processing request (area E4 in this case) overlaps with another area for which use has been allowed (Step S801 in FIG. 28). Since it overlaps with the area E1 for which use has been allowed here, processing advances to Step S802. In Step S802, CPU judges whether priority of the target area (E4 in this case) is higher than that of the other area (E1 in this case). Since the target area has the higher priority here, processing advances to Step S803, and write processing for the target area is executed. In other words, the CPU 12 overwrites the target area (E4 in this case) portion of V-RAM 42 according to the display processing request.

Figure 29:
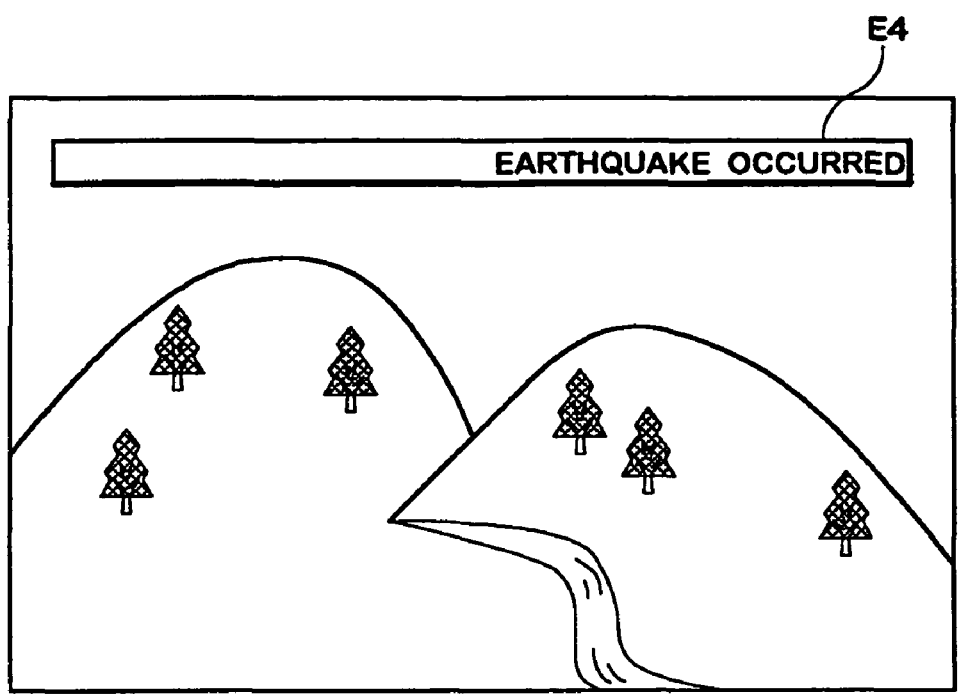
FIG. 29 is a drawing depicting an example of a screen when a display area for urgent display having high priority is created.

In this way, the urgent display, as shown in FIG. 29, is executed. By creating an area for the urgent display to overlap another area and by assigning a higher priority, as shown in this example, an appropriate urgent display becomes possible while efficiently using the screen.

When a display request processing is executed for the display area E1 in the status shown in FIG. 29, the processing flow is as follows. Since the other area E4 has a higher priority in Step S802, processing advances to Step S804. In Step S804, write processing is executed for the target area, excluding the portion of the other area. In other words, the CPU 12 overwrites the target area E1 portion of V-RAM 42, excluding E4, according to the display processing request. As a result, the display area E1 can be overwritten without deleting the urgent display of the display area E4.

5. Fourth Embodiment

In accordance with the third embodiment, when a plurality of processing units request acquisition of display areas which cannot coexist, a processing unit which requested a display area having the highest priority is allowed use of the display area. However, priority may be assigned to each processing unit so that a processing unit having the highest priority is allowed use of the display area.

Figure 31:
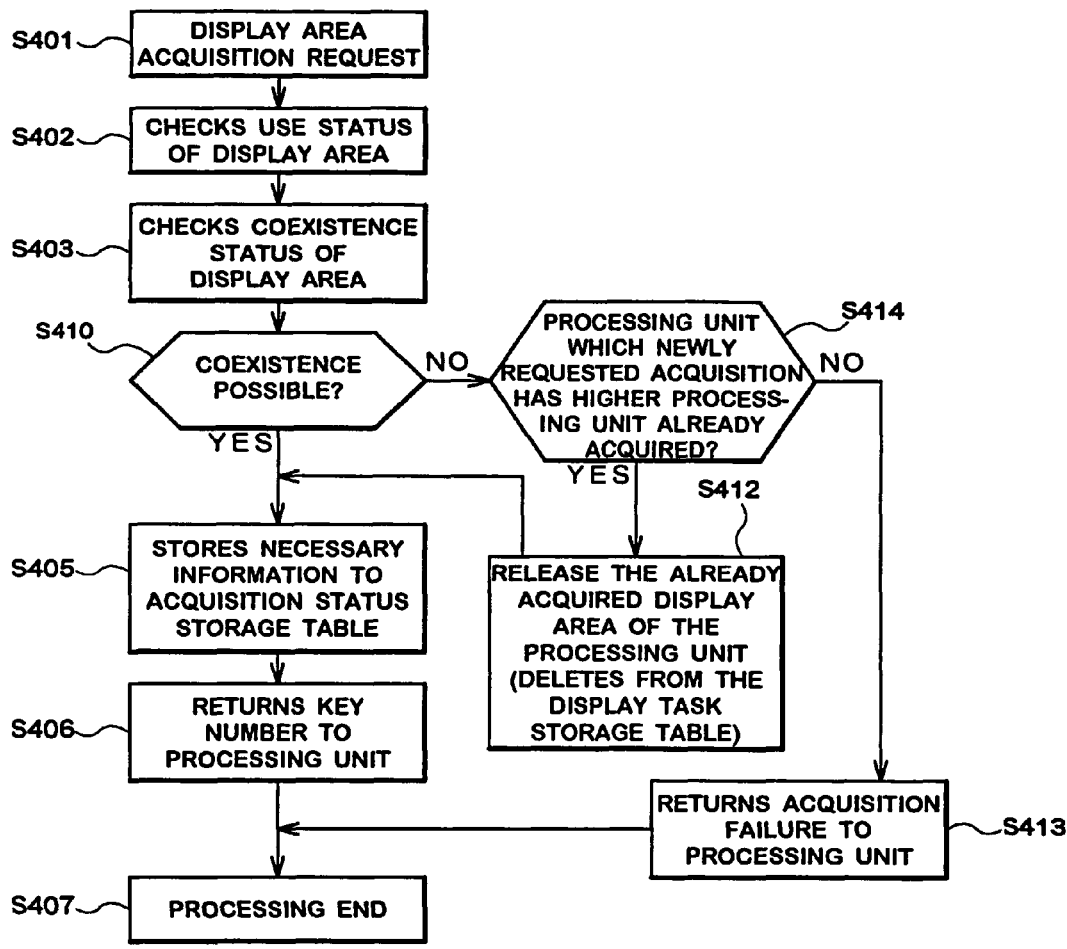
FIG. 31 is a flow chart showing an acquisition request processing of a display control program in accordance with the fourth embodiment.

In this case, it is preferable that the processing unit priority table shown in FIG. 30 is stored in the ROM 16, and the acquisition request processing shown in FIG. 31 is executed. In FIG. 31, when a plurality of processing units request acquisition of display areas which cannot coexist, it is judged whether the processing unit newly requested acquisition has a higher priority than a processing unit which has acquired an area which cannot coexist (Step S414). If the processing unit which newly requested acquisition has a higher priority, the display area of the processing unit which has acquired the display area is released, and the processing unit which newly requested acquisition is allowed use of the display area (Step S412).

The order of acquisition requests, priority of the display areas, and priority of the processing units may be freely combined in deciding which processing unit is allowed use of the display area.

6. Fifth Embodiment

Figure 32:
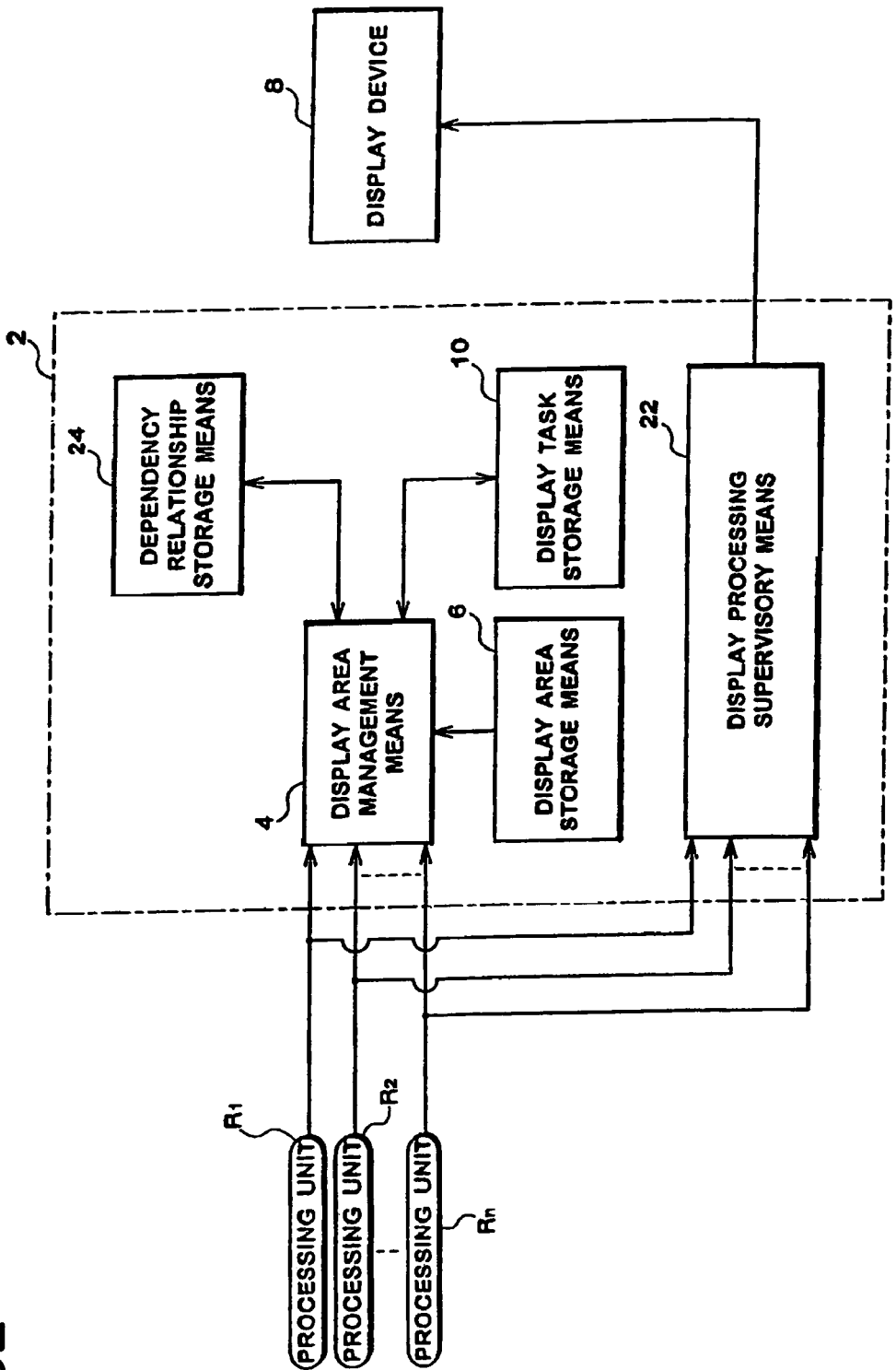
FIG. 32 is a drawing depicting a general configuration of the display control device 2 according to the fifth embodiment.

FIG. 32 shows a general configuration of the display control device 2 according to the fifth embodiment of the present invention. In this embodiment, dependency relationship storage means 24 is disposed. In the dependency relationship storage means 24, display areas which cannot coexist with the requested display area are indicated, and display area change information for making display areas coexist has been recorded. Based on the information of the dependency relationship storage means 24, the display area management means 4 judges whether a display area which cannot coexist with the requested display area have been acquired by another processing unit. When the display area has already been acquired, the display area management means 4 changes the already acquired display area of the processing unit for making it coexist based on the information of the dependency relationship storage means 24, and allows the processing unit which requested acquisition use of the requested display area.

The hardware configuration, when the display control device 2 in FIG. 32 is applied to a digital broadcasting receiver, is the same as in FIG. 3. In the ROM 16, however, dependency relationship information is also recorded, in addition to the definitions of display areas and the display control program.

The definitions of display areas in this embodiment are the same as FIG. 14, and the content of the display area definition table is the same as FIG. 15. The acquisition status storage table is the same as FIG. 16.

FIG. 33 shows the content of the dependency relationship table for recording dependency information. The dependency relationship table is stored in the ROM 16. The second line of this table, for example, shows that when acquisition is requested for the display area E2, and if the display area E1 has been acquired by another processing unit, coexistence is made possible by changing the area of another processing unit from E1 to E3.

Figure 34:
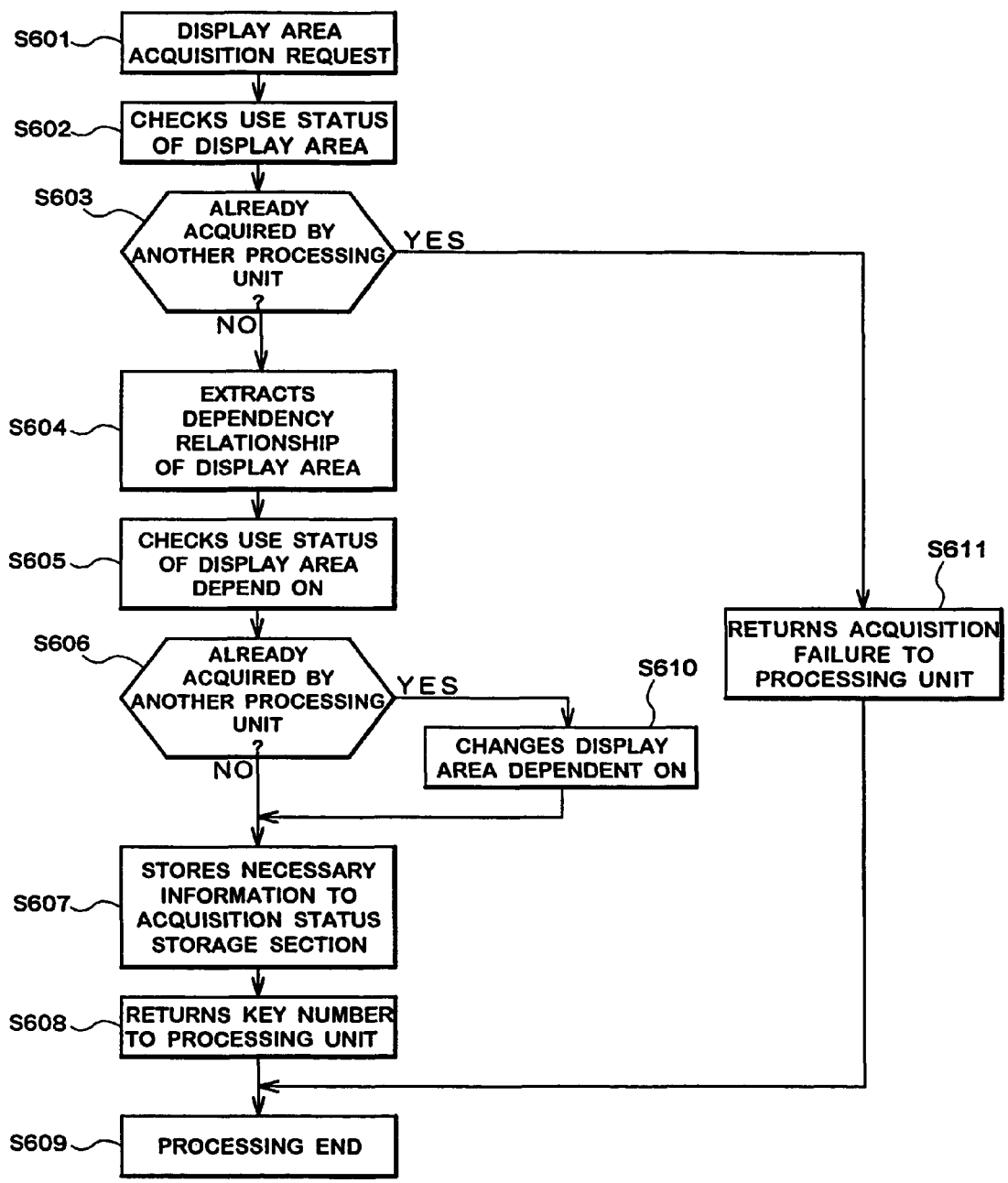
FIG. 34 is a flow chart showing an acquisition request processing portion of a display control program in accordance with the fifth embodiment.

FIG. 34 shows a flow chart of an acquisition request processing portion of the display control program recorded in the ROM 16. The case when the processing unit R2 requests acquisition of the display area E2 while the display area E1 has been acquired by the processing unit R1 (see FIG. 35A) will be explained below.

When an acquisition request is received from the processing unit R2, the CPU 12 starts the processing shown in FIG. 34 (Step S601). At first, referring to the acquisition status storage table, the CPU 12 judges whether the requested display area E2 has been acquired by another processing unit. If it has been acquired, processing advances to Step S611, and the CPU 12 returns an acquisition failure notice to the processing unit R2. In this case, the display area E2 is open, as shown in FIG. 35A, so the processing advances to Step S604.

In Step S604, referring to the dependency relationship table shown in FIG. 33, the CPU 12 obtains information on areas which the requested display area E2 depends on. In this case, the display areas E1, E4 and E5 are areas which the display area E2 depends on.

Then referring to the acquisition status storage table, the CPU 12 judges whether the display areas E1, E4 and E5 which the display area E2 depends on have been acquired by another processing unit (Step S606). If they have not been acquired by another processing unit, the CPU 12 allows the processing unit which requested acquisition to use the display area in Steps S607 and S608, regarding that use of the display area will not cause any problems in terms of display area coexistence. In this case, the display area E1 (entire screen area) which the display area E2 depends on has been acquired by the processing unit R1. Therefore if use of the display area E2 (left half screen area) were allowed to the processing unit R2, a part of the display area would overlap and appropriate display would not be executed.

So in this embodiment, the display area of the processing unit R1 is changed from E1 (entire screen area) to E3 (right half screen area) according to the dependency relationship table in FIG. 33 (Step S610). After this change, the processing unit R2 which requested acquisition is allowed use of the display area E2 (left half screen area). As a consequence, the processing unit R1 displays on the right half of the screen, and the processing unit R2 displays on the left half of the screen.

In Steps S607 and S608, the CPU 12 releases the display area E1, and at the same time notifies changes to the display area T3, a new key number, "3105151322", to the processing unit R1, and sends key number "2205151321" to the processing unit R2 for the display area T2. FIG. 35B shows the content of the acquisition status storage table after change.

In this way, when acquisition is requested for a display area which cannot coexist, allocation of display areas is changed so that coexistence becomes possible.

In accordance with this embodiment, the display area which has been acquired is changed to make coexistence possible, but the display area which acquisition is requested may be changed to make coexistence possible. When the display area E2 (left half screen area) has been acquired by the processing unit R1, for example, if the display area El (entire screen area) is requested by the processing unit R2, the request of the processing unit R2 may be changed to the display area E3 (right half screen area) for which use is allowed.

7. Sixth Embodiment

Figure 36:
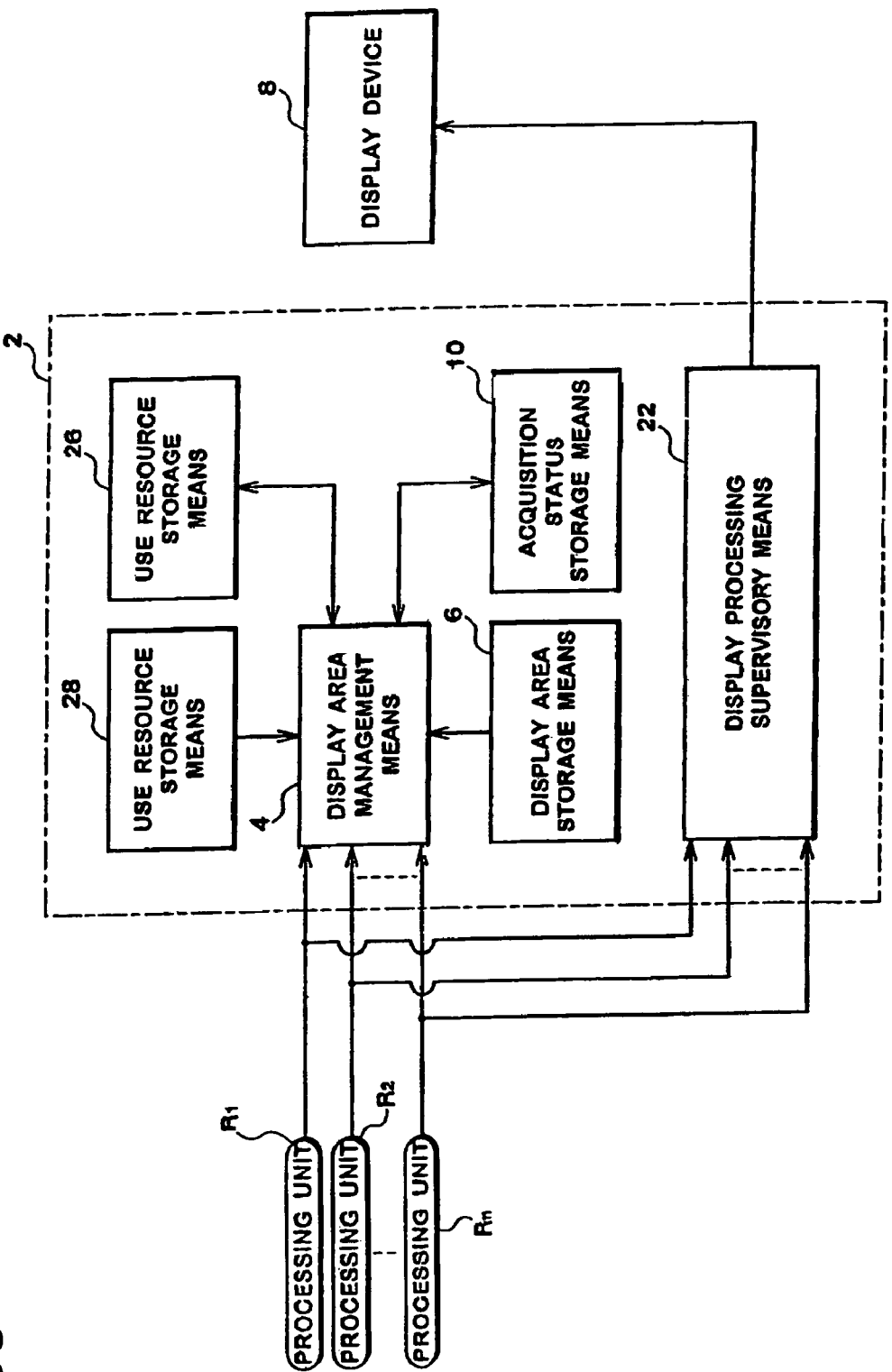
FIG. 36 is a drawing depicting a general configuration of the display control device 2 according to the sixth embodiment.

FIG. 36 shows a general configuration of the display control device according to the sixth embodiment of the present invention. In this embodiment, an available resource storage means 28 and a use resource storage means 26 are disposed. The available resource storage means 28 stores information on resources of each processing unit R1-Rn. Here the concept "resource" includes not only such hardware as a modem, speaker, video equipment, CD-ROM and DVD drive, but also such software as data and programs. The use resource storage means 26 stores the current availability status of each resource.

When a display area acquisition request is received from processing units R1-Rn, the display area management means 4 judges whether the display area can coexist with the display areas which have been acquired by other processing units. If coexistence is not possible, the processing unit is not allowed use of the display area. If coexistence is possible, the display area management means 4 obtains information on a resource to be used by the processing unit which requested acquisition referring to the available resource storage means 28. Then referring to the use resource storage means 26, the display area management means 4 checks whether the resource can be used now. If the resource cannot be used, the display area management means 4 does not allow the processing unit which requested acquisition use of the display area. This is because allowing use of the display area is meaningless since the processing unit cannot execute processing using the resource. For example, when the processing unit cannot display unless the resource is available, display is not executed even if use of the display area is allowed to the processing unit.

With the foregoing in view, it is preferable to judge whether resources required for display processing can be used. A resource which is not directly related to display processing but is very closely related to screen display, such as a speaker, may also be judged whether it can actually be used. In other words, not only resources which the processing unit needs for display processing but also resources required for sound processing related to the display processing may be judged whether they can actually be used.

The hardware configuration, when the display control device 2 in FIG. 36 is applied to a digital broadcasting receiver, is the same as FIG. 3. In the ROM 16, however, the available resource table shown in FIG. 37 is stored. In the work memory 14, the use resource table shown in FIG. 38 is stored.

Figure 39:
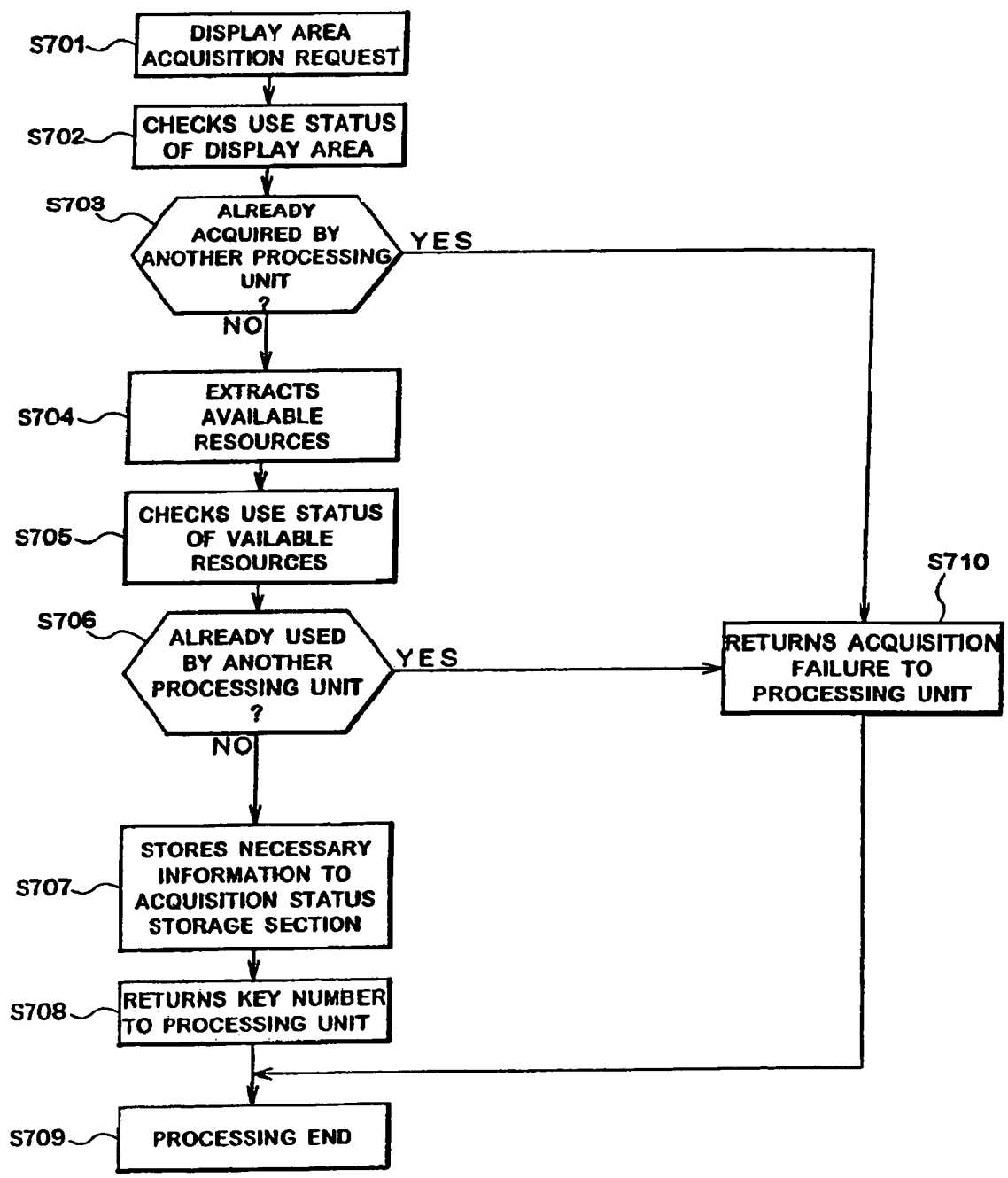
FIG. 39 is a flow chart showing an acquisition request processing portion of a display control program in accordance with the sixth embodiment.
Figure 40:
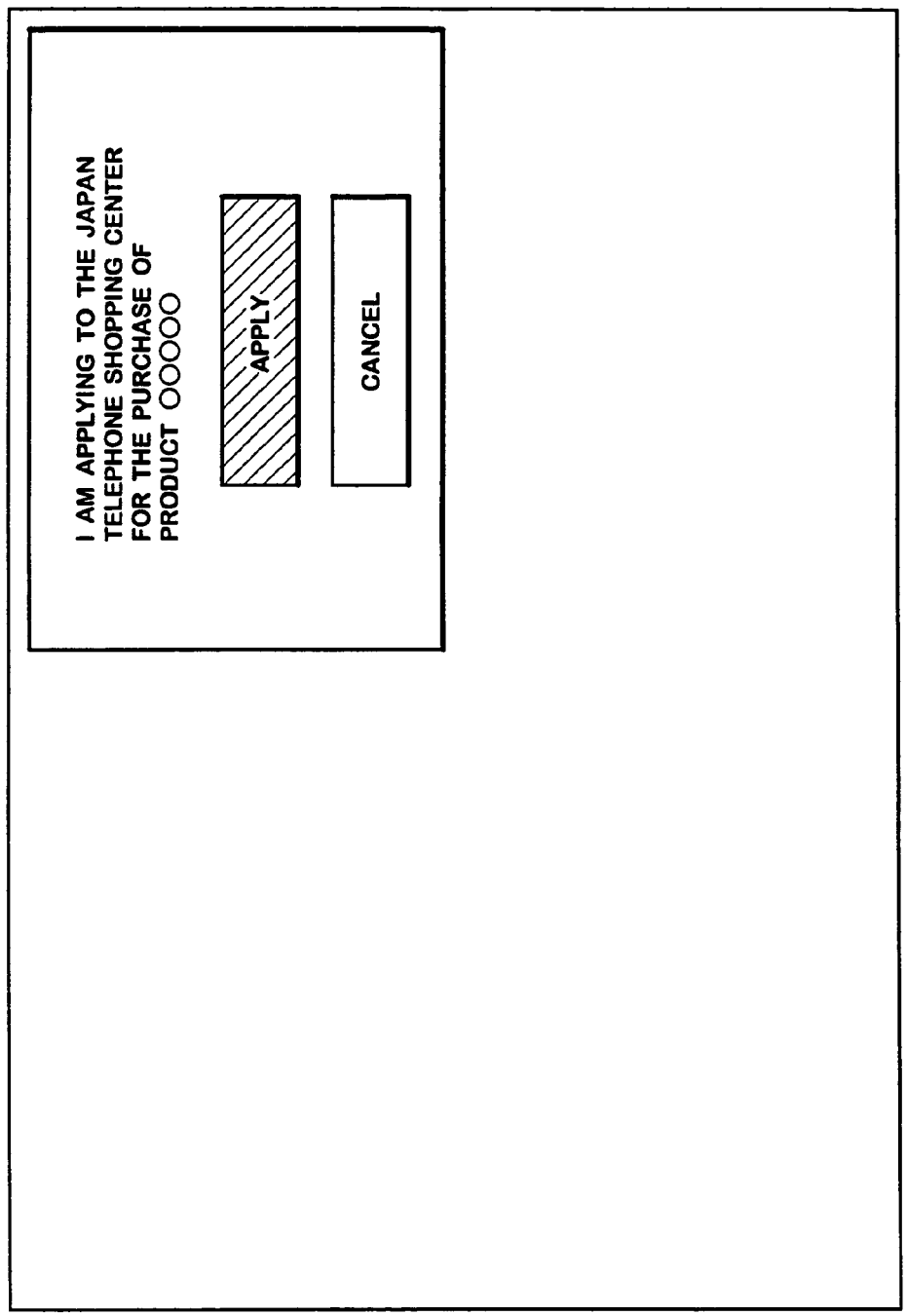
FIG. 40 is an example of a display on a screen.

FIG. 39 shows a flow chart of the acquisition request processing portion of the display control program recorded in the ROM 16. Here, the case when the task T2 of the processing unit R2 requests acquisition of the display area E3 at the lower part of the screen while the task T1 of the processing unit R1 has acquired the display area E2 at the upper right of the screen, as shown in FIG. 7B, will be explained. It is assumed that the processing unit 2 is a browser application. The browser application accesses the Internet via a modem 17 to read home pages. It is also assumed that the processing unit R1 is a telephone shopping application which executes display, as shown in FIG. 40. Here, the viewer has selected a purchase application, therefore the CPU 12 calls the reception center of the telephone shopping company via the modem 17. In other words, the modem 17 has already been used by the telephone shopping application (processing unit R1) as shown in FIG. 38.

When an acquisition request is received from the browser application (processing unit R2), the CPU 12 starts the processing shown in FIG. 39 (Step S701). Then referring to the acquisition status storage table in FIG. 7B, the CPU 12 judges whether the requested display area E3 has been acquired by another processing unit (Steps S702, S703). In this case, the display area E3 is open, so processing advances to Step S704.

In Step S704, referring to the available resource table in FIG. 37, the CPU 12 extracts resources to be used by the processing unit R2 which requested acquisition. In this case, a modem and a speaker are extracted. Then referring to the use resource table in FIG. 38, the CPU 12 judges whether the extracted modem and speaker are in use by another processing unit (Steps S705, S706). When all extracted resources can be used, the CPU 12 allows use of the display area to the processing unit, and writes that the resources to be used by the processing unit are in use in the use resource table in FIG. 38 (Steps S708, S709).

In this case, the modem is in use by the telephone shopping application (processing unit R1), as shown in FIG. 38, so processing advances from Step S706 to S710. In Step S710, the CPU 12 notifies the browser application (processing unit R2) that display area acquisition failed. In this way, it is judged whether use of the display area is allowed considering the use status of resources.

When a processing unit requests to release an area, the CPU 12 writes the release of the resource which the processing unit has been using in the use resource table. As a consequence, always the latest use status is stored in the use resource table.

In accordance with the above embodiment, the resource cannot be used if another processing unit is using it. However, for a resource which specified the number of processing units (or tasks) that can be used simultaneously, whether that resource can be used may be judged by the number of processing units (tasks) which are actually using the resource.

In the above explanation, use of the display area is allowed after judging whether such a resource as a modem is available. However, when the processing unit is for displaying the data of an electronic program schedule, use of the display area may be allowed after judging whether the data is actually received. In other words, the resources include not only hardware but also such software as data.

8. Seventh Embodiment

In accordance with the above embodiments, when acquisition is requested for a display area which cannot coexist, an acquisition failure notice is returned to the processing unit. However, the processing unit which is not allowed use of the display area may be stored as acquisition waiting, so as to acquire the display area when use can be allowed.

Figure 41:
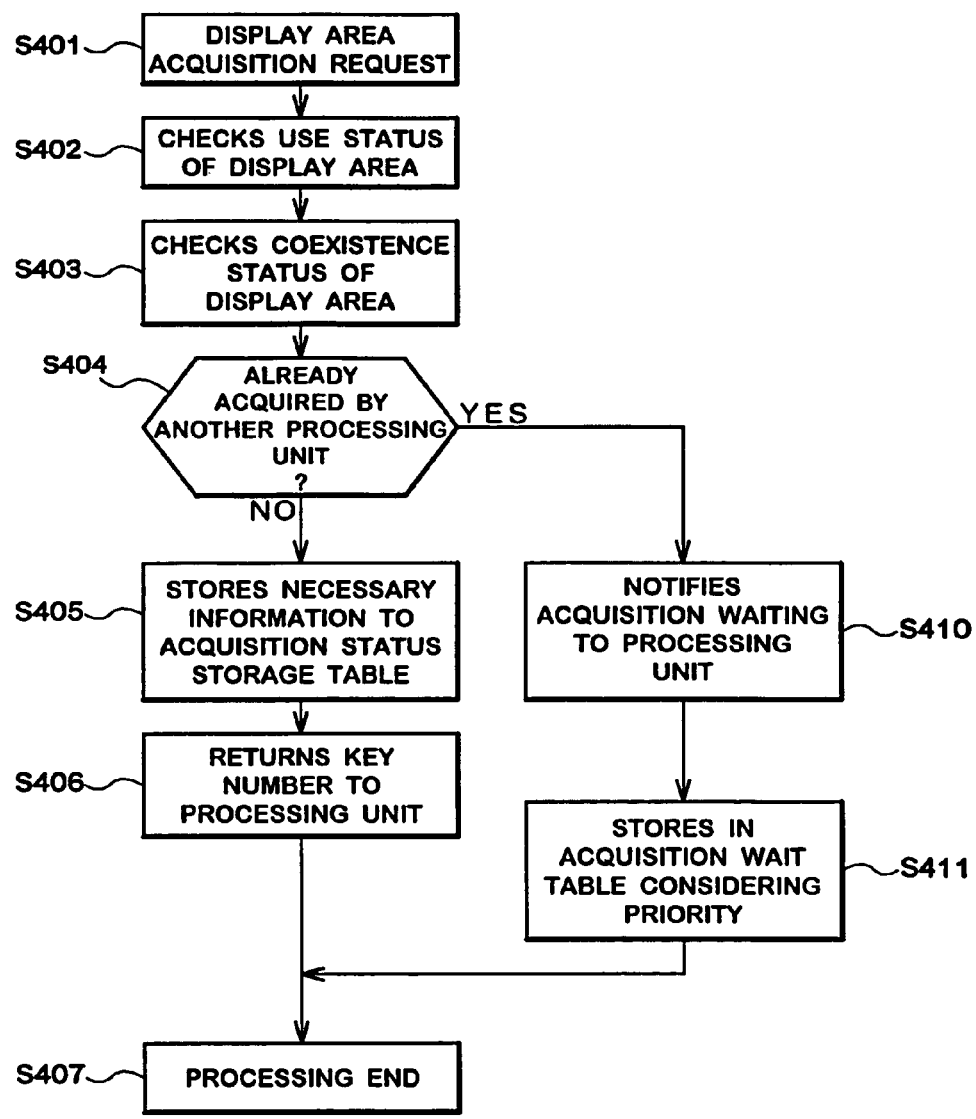
FIG. 41 is a flow chart showing an acquisition request processing portion of a display control program in accordance with the seventh embodiment.
Figure 42:
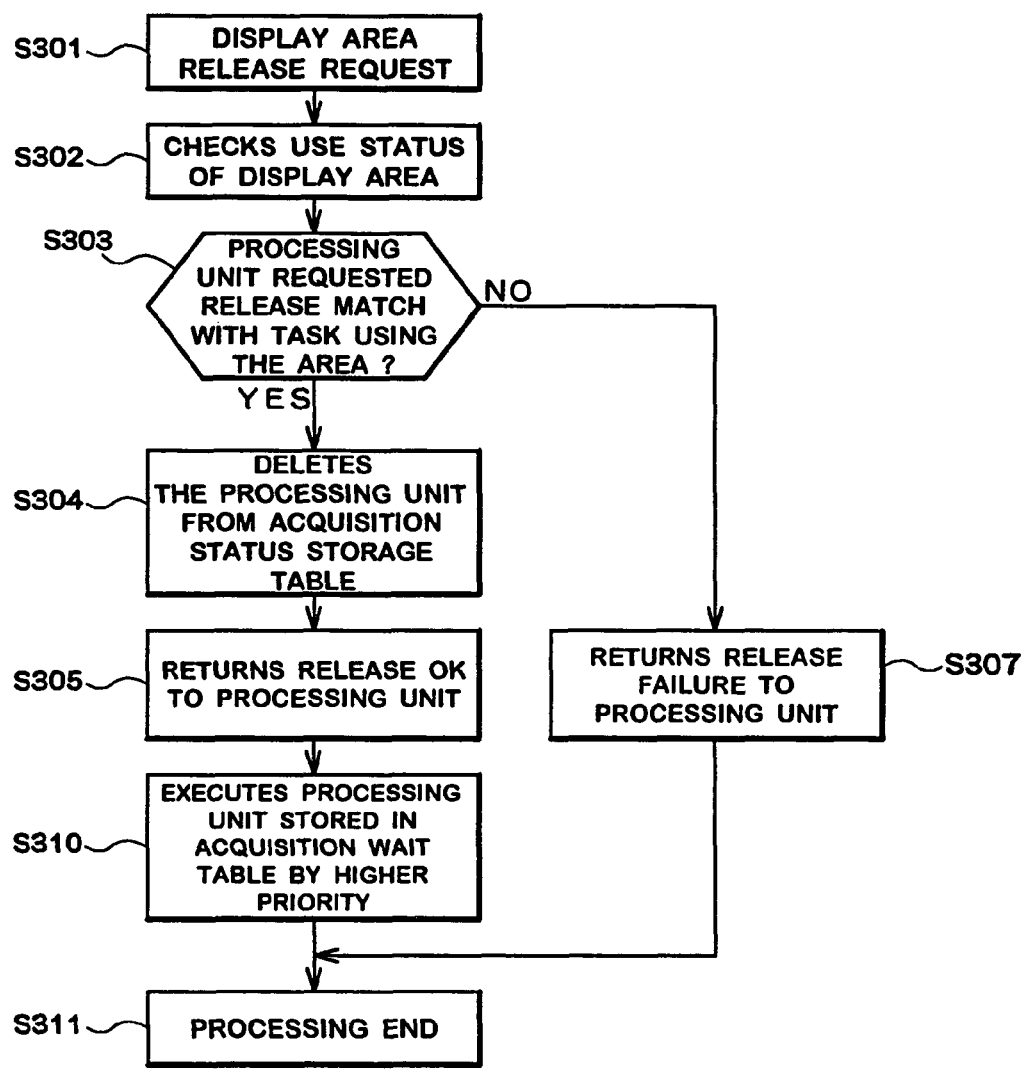
FIG. 42 is a flow chart showing a release request processing portion of the display control program in accordance with the seventh embodiment.

This embodiment will be explained based on the second embodiment in FIG. 13. The flow chart of acquisition request processing is shown in FIG. 41, instead of FIG. 18. The flow chart of release request processing is shown in FIG. 42. In the work memory 14, the acquisition waiting table, as shown in FIG. 43, is stored.

Here, the case when the content of the acquisition status storage table is in the status shown in FIG. 16C (that is, the status when the processing unit R1 is using the left of the screen and the processing unit R2 is using the right of the screen) and the processing unit R4 newly requests acquisition of the display area E2 will be explained. It is assumed that nothing has been stored in the acquisition wait table, as shown in FIG. 43A.

When an acquisition request from the processing unit R4 is received, the CPU 12 refers to the acquisition status storage table (FIG. 16) and coexistence relationship table (FIG. 17), and judges whether use of the display area E2 can be allowed (Step S402, S403, S404). In this case, the display area E2 has been acquired by the processing unit R1 and cannot coexist, so processing advances to Step S410.

In Step S410, the CPU 12 notifies acquisition waiting to the processing unit R4, and the CPU 12 stores information that the processing unit R4 is waiting for acquisition of the display area E2 in the acquisition wait table (Step S411).

When processing units have already been stored in the acquisition wait table, the processing units may be rearranged according to predetermined priority. In other words, the processing units are rearranged such that a processing unit with a higher priority comes first. For the priority used for this rearrangement, the order of sending acquisition requests, priority assigned to the requested display areas (see FIG. 23), and priority assigned to processing units (FIG. 30), for example, can be used.

In this way, the processing unit which is not allowed use is stored in the acquisition wait table.

Next, release request processing will be explained referring to FIG. 42. Here, it is assumed that the processing unit R1 requests the display area E2 in the status shown in FIG. 16C for explanation. The acquisition wait table is assumed to be in the status shown in FIG. 43B.

When the release request is received, the CPU 12 refers to the acquisition status storage table, and judges whether the processing unit R1 which requested release of the display area E2 has acquired the display area E2 (Steps S302, S303). Since the processing unit R1 has acquired the display area E2 in this case, the CPU 12 deletes the processing unit R1 from the acquisition status storage table and returns a release OK notice (Steps S304, S305).

Figure 44:
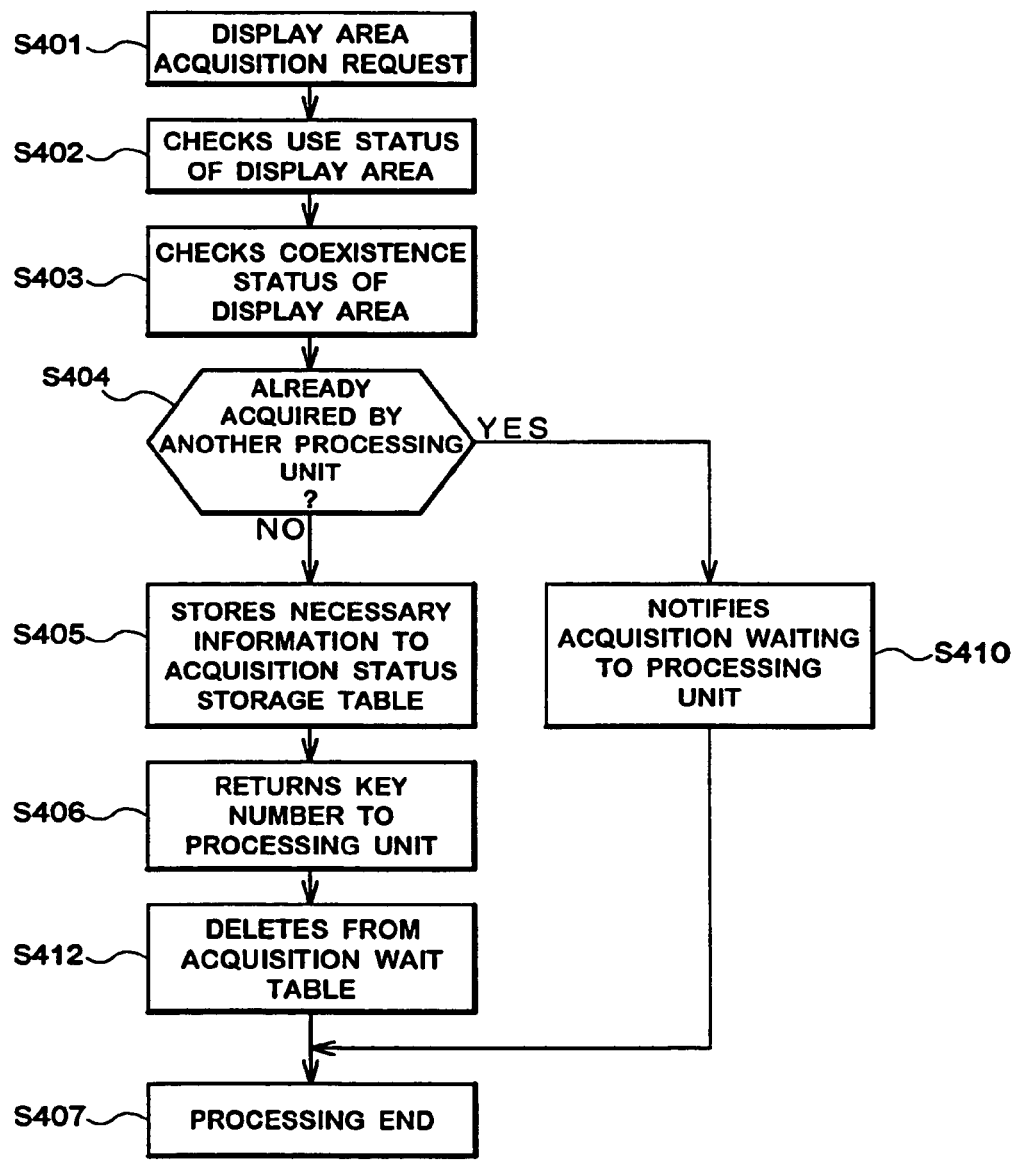
FIG. 44 is a flow chart showing a portion of a processing acquisition request in waiting status of the display control program in accordance with the seventh embodiment.

Then the CPU 12 advances to Step S310 and reads the acquisition wait table, shown in FIG. 43B, from the beginning. Here, the request by the processing unit R4 for the display area E2 is read. For this acquisition request in wait status, the CPU 12 executes processing of the acquisition request in wait status, as shown in FIG. 44. Since the area E2 requested by the processing unit R4 can coexist in this case, processing advances from Step S404 to S405.

In Step S405, the CPU 12 stores the processing unit R4 in the acquisition status storage table and returns the key number to the processing unit R4 (Steps S405, S406). Then the CPU 12 deletes the acquisition request by the processing unit R4 for the display area E2 from the acquisition wait table (Step S412).

In this way, the processing unit R4 can be allowed to acquire the display area at the point when use of the display area becomes possible.

Then the CPU 12 reads the next acquisition request stored in the acquisition wait table, and executes the processing shown in FIG. 44 for this request as well. This is because two or more requests may be allowed to use a respective area when the released area is large. After executing processing for all acquisition requests in wait status in the order of priority, the CPU 12 ends release request processing (Step S407).

In accordance with this embodiment, each processing unit which requested acquisition is eventually allowed use of the respective area according to the change of status even if use is not immediately allowed.

9. Other Embodiments

Figure 12:
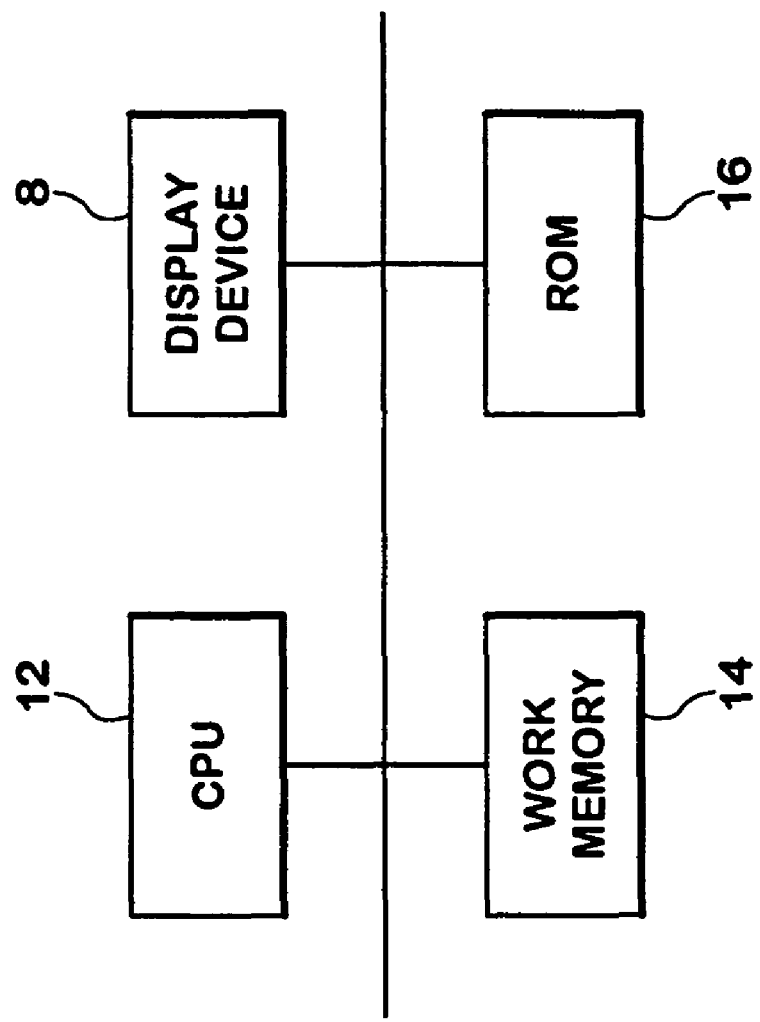
FIG. 12 is a drawing depicting a basic hardware configuration of the display control device according to the embodiment of the present invention.

In the above embodiments, the case when the present invention is applied to a digital broadcasting receiver was explained, but the present invention can be applied to equipment where a plurality of applications execute display processing. In other words, the present invention can be applied to equipment having the basic configuration shown in FIG. 12 (the work memory 14 and the ROM 16 may be integrated). For example, the present invention can be applied to a home game machine, a telephone with display and a personal computer.

In a car navigation system, the present invention can be applied for displaying map information and Internet information, for example.

Also in a DVD system, the present invention can be applied when image information and such text information as a menu are displayed during the authoring of images.

The present invention can also be applied to the screen display of a personal computer. Particularly, the present invention is effective for computers used in factory automation (FA), where the user cannot change the screen display format.

In the above embodiments, the tasks T1-Tn for carrying out display processing are executed by the CPU 12, but may be executed by another CPU.

Also in the above embodiments, display areas have been defined in advance, but the user may change the size and position of the display areas.

Also in the above embodiments, each means in the general configuration is implemented by the CPU, but a part or all of the means may be configured by hardware logic.

10. Eighth Embodiment 10.1 General Configuration

In accordance with the above embodiments, it is judged whether the display area subject to the acquisition requested can coexist with other display areas which have been used, and if coexistence is possible, use of the display area is allowed. However, processing units which are allowed use of the display area may be predetermined for each display area so that allowing use of the display area is judged according to this information.

Figure 45:
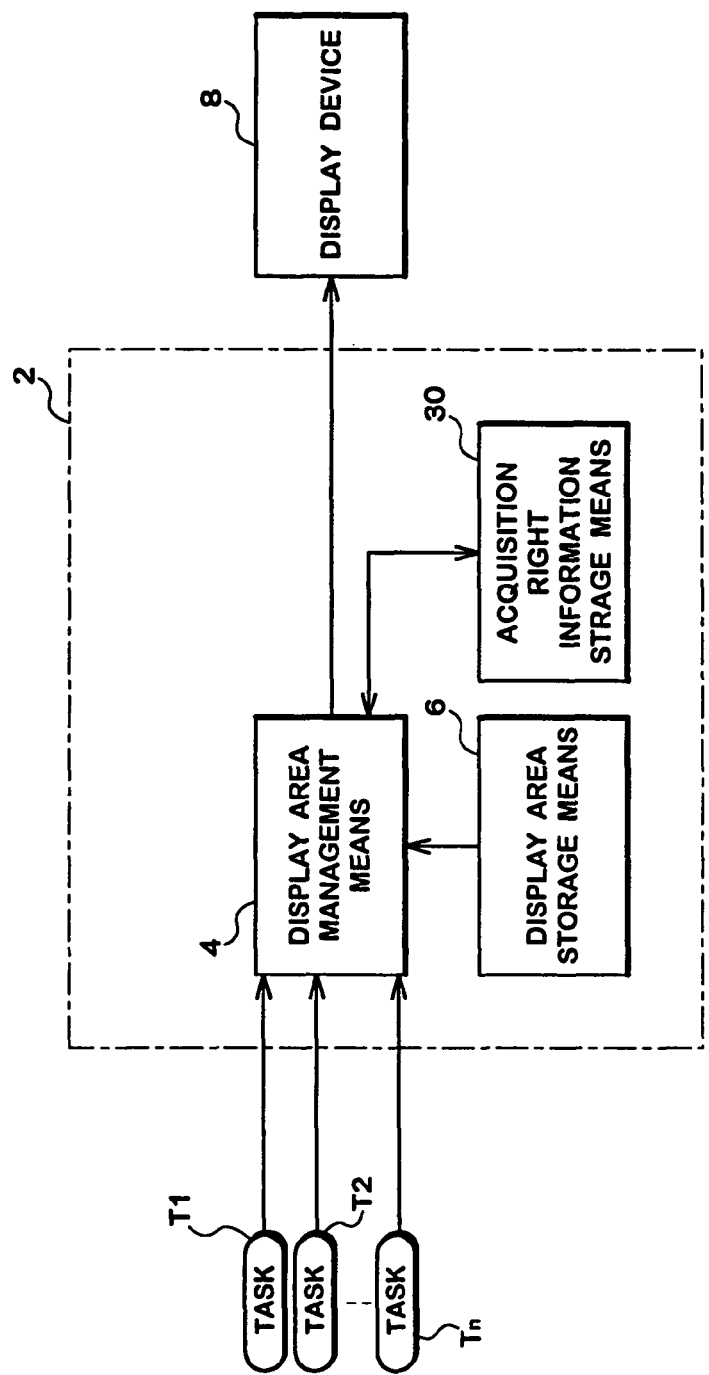
FIG. 45 is a drawing depicting a general configuration of a display control device according to the eighth embodiment.

FIG. 45 shows the general configuration of the display control device 2 according to the eighth embodiment. The display area storage means 6 stores definitions of the display areas set on the screen of the display device 8. In this embodiment, acquisition right information storage means 30 connected to the display area management means is disposed. The acquisition right information storage means 30 stores processing units which can be allowed use of the display area for each display area. When one of the tasks T1-Tn requests acquisition of a display area, the display area management means 4 judges whether use of the display area can be allowed to the task based on the content stored in the acquisition right information storage means 30. If the acquisition right for the requested display area is given to the task in the acquisition right information storage means 30, use is allowed. If the acquisition right is not given, use is not allowed.

10.2.1 Example When One Processing Unit is allocated to One Display Area

Figure 46:
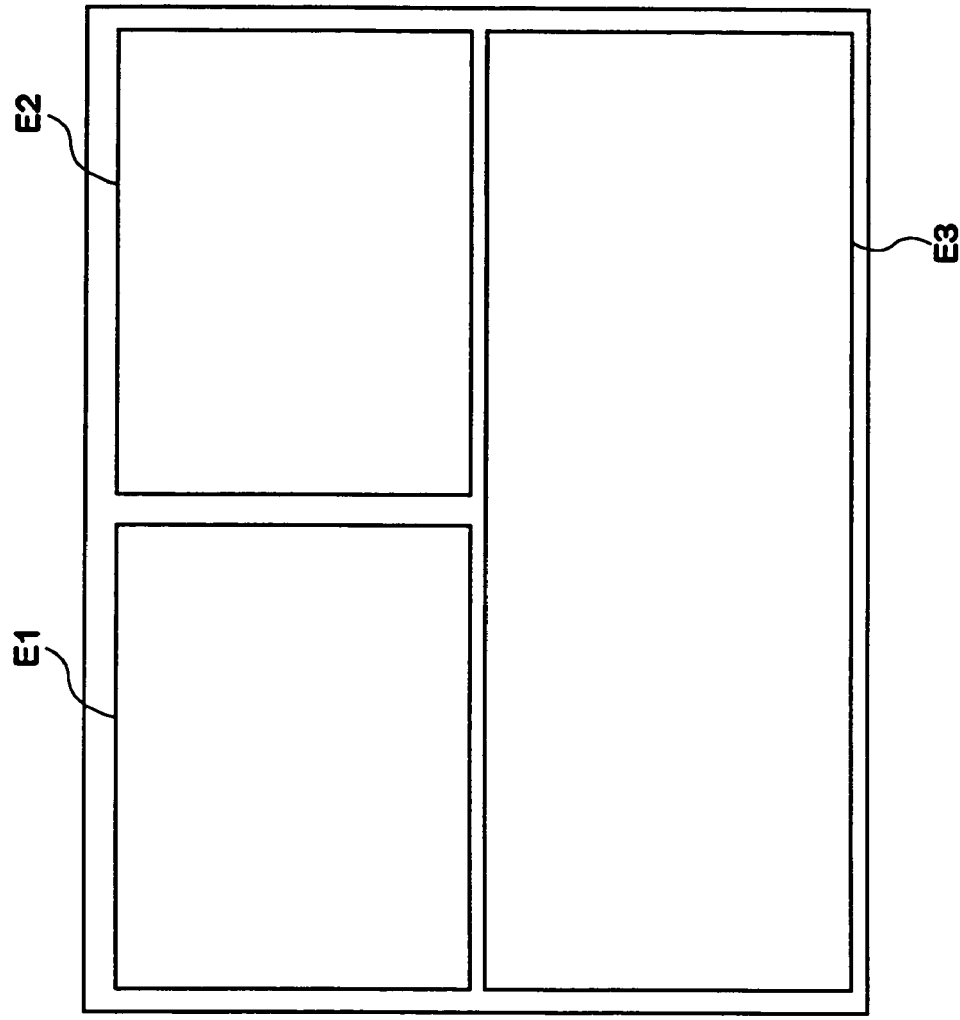
FIG. 46 is an example of a display area definition example.

The hardware configuration, when this embodiment is applied to digital satellite broadcasting, is shown in FIG. 3. FIG. 46 shows a display area definition example in accordance with this embodiment. FIG. 47 shows the display area definition table stored in the ROM 16. And FIG. 48 shows the acquisition right information table stored in the ROM 16. According to this acquisition right information table, use of the display area E1 is allowed to the task T1, use of the display area E2 is allowed to the task T2, and use of the display area E3 is allowed to the task T3.

Figure 49:
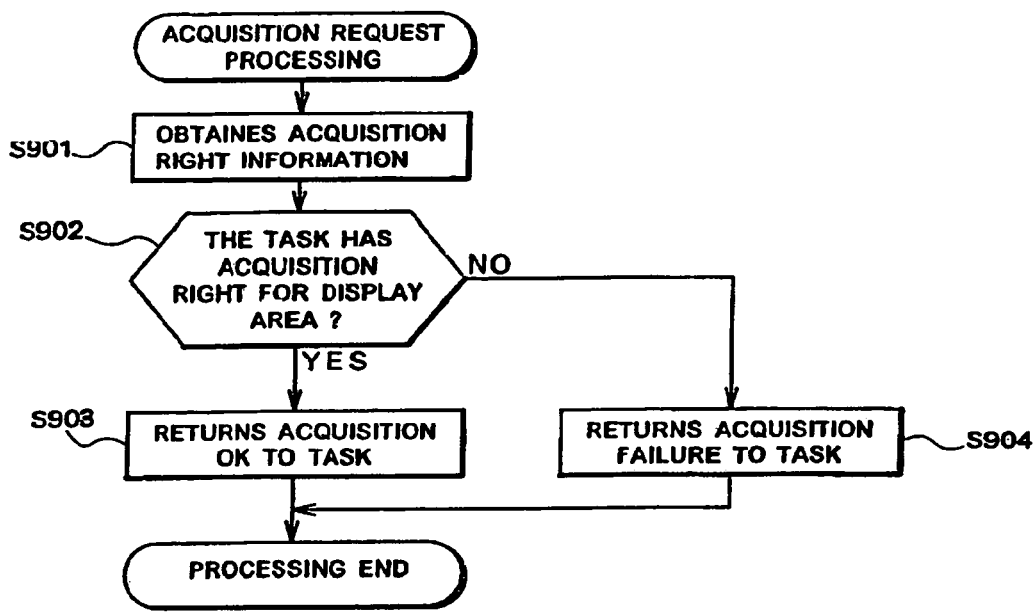
FIG. 49 is a flow chart showing an acquisition request processing portion of a display control program in accordance with the eighth embodiment.

FIG. 49 shows a flow chart of the acquisition request processing portion of the display control program stored in the ROM 16. For example, the case when the task T3 requests acquisition of the display area E1 will be explained. At first, the CPU 12 obtains the acquisition right information table from the ROM 16 (Step S901). Then the CPU 12 judges whether the task T3, which requested the acquisition, has an acquisition right for the display area E1 referring to the acquisition right information table (Step S902). In this case, the task T3 does not have an acquisition right for the display area E1, so the CPU 12 notifies an acquisition failure to the task T3 (Step S904).

When the task T1 requests acquisition of the display area E1, the CPU 12 also judges whether use is allowed referring to the acquisition right information table in the same manner (Step S902). In this case, the task T1 has an acquisition right for the display area E1, so the CPU 12 notifies an acquisition OK to the task T1 (Step S903).

In this way, in accordance with this embodiment, each display area is defined so as not to overlap, and only one processing unit (task) is allowed use of each display area, therefore the display of each task does not overlap and is not lost.

10.3 Example When a Plurality of Processing Units are Allocated to One Display Area The acquisition right information table may be defined as shown in FIG. 50, so that one display area can be used by a plurality of tasks (processing units). In this state, acquisition request processing is executed so that only one task (processing unit) is allowed use of each display area. For example, when the task T1 requests acquisition of the display area E1, use is allowed if no other tasks have acquired the display area. When the task 1 requests acquisition of the display area E1, use is not allowed when another task (task T2 or T5) has acquired the display area.

In this way, when a plurality of tasks (tasks which have an acquisition right for the display area) request acquisition of one display area, the task which requested acquisition first is allowed use of the display area. However, the task which requested acquisition last may be allowed use of the display area. Also priority may be assigned to each task in advance so that a task which has the highest priority is allowed use of the display area.

10.4.1 Example When a Plurality of Tasks are Allowed to Use One Display Area

In this example, when a plurality of tasks (tasks which have an acquisition right for the display area) request acquisition of one display area, a plurality of tasks which requested acquisition are allowed use of the display area. In this case, display processing is executed by the plurality of tasks which are allowed use of the display area for the one display area. Therefore, in this case, display processing among the plurality of tasks which are allowed use of the one display area is adjusted among the tasks. In other words, an adjustment of display processing among the tasks is necessary, but this adjustment among the tasks is easy since the number of tasks which can use each display area is limited.

The upper limit of the number of tasks (number of processing units) which can be used simultaneously may be defined in the acquisition right information table, as shown in FIG. 51. In this table, use of the display area E1 is allowed to the tasks T1, T2 and T5, but the number of tasks which can be allowed simultaneously is defined as 2. Use of the display area E2 is allowed to the task T2, and the number of tasks which can be allowed simultaneously is defined as 1. Also, use of the display area E3 is allowed to the task T3 and T4, and the number of tasks which can be allowed simultaneously is defined as 2. In this embodiment, the work memory 14 has the acquisition status storage table shown in FIG. 53, to manage the number of tasks using each display area.

Figure 52:
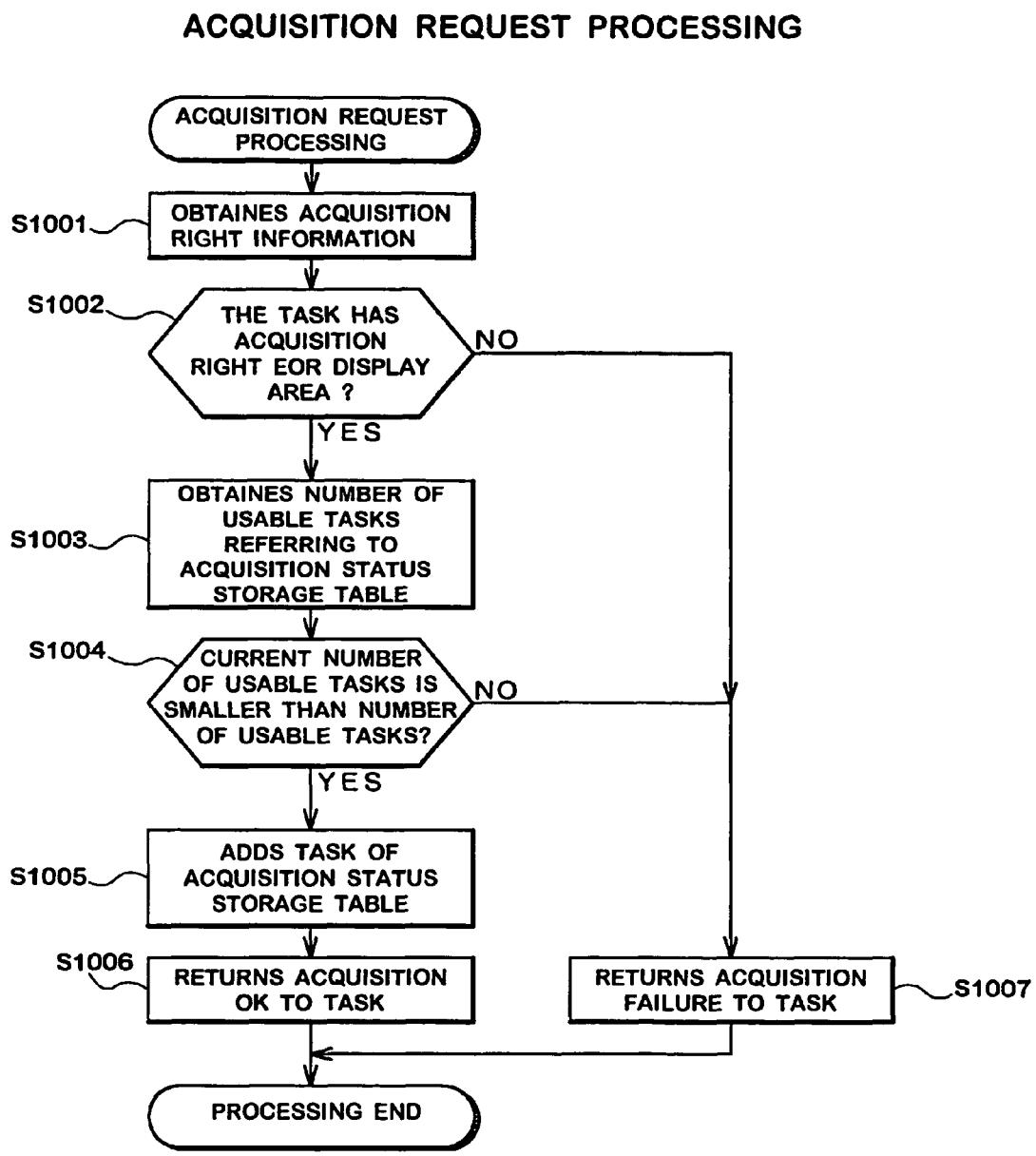
FIG. 52 is a flow chart showing an acquisition request processing portion of the display control program.

FIG. 52 shows a flow chart of acquisition request processing in accordance with this embodiment. Here, the case when the task T5 requests acquisition of the display area El while the tasks T1 and T2 have been allowed use of the display area E1, as shown in FIG. 53, will be explained as an example.

At first, the CPU 12 obtains the acquisition right information (Step S1001), and judges whether the task T5 has an acquisition right for the display area E1 (Step S1002). In this case, the task T5 has the acquisition right (see FIG. 51), so processing advances to Step S1003. In Step S1003, the CPU 12 obtains information on the number of tasks using the display area E1 referring to the acquisition status storage table in FIG. 53. In this case, the CPU 12 recognizes that two tasks, T1 and T2, are using the display area E1.

Then the CPU 12 judges whether the number of tasks using the display area, which is 2, is smaller than the number of tasks which can use the display area written in the acquisition right information table, which is 2 (Step S1004). In this case, the former is not smaller than (equal to) the latter, so the CPU 12 judges that no more tasks are allowed use of the display area, and notifies an acquisition failure (Step S1007).

In this way, tasks exceeding the number of tasks which can use the display area are not allowed use of the display area. By limiting the number of tasks which can use the display area like this, the adjustment of display processing among tasks is prevented from becoming complicated.

In the above embodiment, the CPU 12 refers to the acquisition right information table, as shown in FIG. 50, and the task T3 is not allowed use of the display area E1, for example. However, a task which is not written in the acquisition right information table, such as the task T3, may be allowed use of the display area if acquisition is requested by the task alone, so that when acquisition is requested by a task having an acquisition right (e.g. T1), the task having the acquisition right is allowed use of the display area and use by the task T3 is cancelled.

The eighth embodiment can be implemented by combining with one of the first to seventh embodiments. Also for the eighth embodiment, a modification similar to the second to seventh embodiments can be applied to the first embodiment.

While the embodiments of the present invention, as disclosed herein, constitute preferred forms, it is to be understood that each term was used as illustrative and not restrictive, and can be changed within the scope of the claims without departing from the scope and spirit of the invention.

What is claimed is:

1. A device for controlling a display on a display device in response to one or more applications, comprising:
a receiver that receives a request from one of the applications for acquiring one of predefined display areas each of which is defined so as not to overlap each other;
a display area manager that determines whether or not to provide an authorization to acquire the one of the predefined display areas in response to the request; and
a storer that stores information of an application waiting for acquiring one of the predefined display areas,
wherein, when a plurality of requests for acquiring the same one of the predefined display areas from a plurality of applications are received by the receiver, the authorization is provided to one and only one of the applications that made one of the requests for acquiring the same one of the predefined display areas, a return of an acquisition failure notice determines whether a display area can coexist, and
the information of another application which is not provided the authorization is stored in the storer.

2. The device of claim 1, wherein the authorization is provided to said another application waiting to acquire the same one of the predefined display areas in order after the authorized one and only one of the applications releases the same one of the predefined display areas.

3. The device of claim 1, wherein the authorization is provided to said another application waiting to acquire the same one of the predefined display areas in order of the time when each application requested acquiring the same one of the predefined display areas.

4. The device of claim 2, wherein the authorization is provided to said another application waiting to acquire the same one of the predefined display areas in order of the time when each application requested acquiring the same one of the predefined display areas.

5. A method of controlling a display on a display device in response to one or more applications, comprising:
    receiving a request from one of the applications for acquiring one of predefined display areas each of which is defined so as not to overlap each other;
    determining whether or not to provide an authorization to acquire the one of the predefined display areas in response to the request; and
    storing information of an application waiting for acquiring one of the predefined display areas,
    wherein, when a plurality of requests for acquiring the same one of the predefined display areas from a plurality of applications are received, the authorization is provided to one and only one of the applications that made one of the requests for acquiring the same one of the predefined display areas, a return of an acquisition failure notice determines whether a display area can coexist, and
    the information of another application which is not provided the authorization is stored.

6. The method of claim 5, further comprising providing the authorization to one application waiting for acquiring the same one of the predefined display areas in order after the authorized one and only one of the applications releases the same one of the predefined display areas.

7. The method of claim 5, further comprising providing the authorization to one application waiting for acquiring the same one of the predefined display areas in order of the time when each application requested acquiring the same one of the predefined display areas.

8. The method of claim 6, further comprising providing the authorization to said one application waiting for acquiring the same one of the predefined display areas in order of the time when each application requested acquiring the same one of the predefined display areas.

9. A computer readable medium that stores a plurality of instructions to be executed by at least one processor to control a display on a display, the plurality of instructions comprising:
    receiving a request from one of the applications for acquiring one of predefined display areas each of which is defined so as not to overlap each other;
    determining whether or not to provide an authorization to acquire the one of the predefined display areas in response to the request; and
    storing information of an application waiting for acquiring one of the predefined display areas,
    wherein, when a plurality of requests for acquiring the same one of the predefined display areas from a plurality of applications are received, the authorization is provided to one and only one of the applications that made one of the requests for acquiring the same one of the predefined display areas, a return of an acquisition failure notice determines whether a display area can coexist, and
    the information of another application which is not provided the authorization is stored.

10. The computer readable medium of claim 9, further comprising providing the authorization to one application waiting for acquiring the same one of the predefined display areas in order after the authorized one and only one of the applications releases the same one of the predefined display areas.

11. The computer readable medium of claim 9, further comprising providing the authorization to one application waiting for acquiring the same one of the predefined display areas in order of the time when each application requested acquiring the same one of the predefined display areas.

12. The computer readable medium of claim 10, further comprising providing the authorization to said one application waiting for acquiring the same one of the predefined display areas in order of the time when each application requested acquiring the same one of the predefined display areas.

13. The device of claim 1, wherein definitions for the predefined display areas are stored in a display area definition table.

14. The method of claim 5, wherein definitions for the predefined display areas are stored in a display area definition table.

15. The computer readable medium of claim 9, wherein definitions for the predefined display areas are stored in a display area definition table.

16. The device of claim 1, wherein authorization is provided to the application for an entire display area and not a part of the display area.

17. The method of claim 5, wherein authorization is provided to the application for an entire display area and not a part of the display area.

18. The computer readable medium of claim 9, wherein authorization is provided to the application for an entire display area and not a part of the display area.

\* \* \* \* \*